US012369242B1

(12) United States Patent
McCoy et al.

(10) Patent No.: US 12,369,242 B1
(45) Date of Patent: Jul. 22, 2025

(54) LIGHTING SYSTEM WITH DISTRIBUTED PROGRAMMING

(71) Applicant: Haven Lighting, Inc., Union, KY (US)

(72) Inventors: Christopher R. McCoy, Union, KY (US); Jonathan Fazekas, Burlington, KY (US)

(73) Assignee: HAVEN LIGHTING, INC., Union, KY (US)

( * ) Notice: Subject to any disclaimer, the term of this patent is extended or adjusted under 35 U.S.C. 154(b) by 137 days.

(21) Appl. No.: 18/159,178

(22) Filed: Jan. 25, 2023

Related U.S. Application Data

(60) Provisional application No. 63/306,305, filed on Feb. 3, 2022, provisional application No. 63/303,211, filed on Jan. 26, 2022.

(51) Int. Cl.

| | |
|---|---|
| ***H05B 47/155*** | (2020.01) |
| ***G05G 1/01*** | (2008.04) |
| ***H05B 47/16*** | (2020.01) |
| ***H05B 47/165*** | (2020.01) |
| ***H05B 47/175*** | (2020.01) |
| ***H05B 47/19*** | (2020.01) |

(52) U.S. Cl.
CPC ........... *H05B 47/155* (2020.01); *H05B 47/16* (2020.01); *H05B 47/165* (2020.01); *H05B 47/19* (2020.01); *G05G 1/01* (2013.01); *H05B 47/175* (2020.01)

(58) Field of Classification Search
CPC ...... H05B 47/155; H05B 47/19; H05B 47/16; H05B 47/165; H05B 47/175; G05G 1/01
See application file for complete search history.

(56) References Cited

U.S. PATENT DOCUMENTS

| | | | | |
|---|---|---|---|---|
| 10,497,337 | B2 * | 12/2019 | Rains, Jr. | H05B 47/105 |
| 10,624,183 | B1 * | 4/2020 | Recker | H05B 47/20 |
| 2006/0197474 | A1 * | 9/2006 | Olsen | H05B 47/22 315/312 |
| 2012/0284672 | A1 | 11/2012 | Madonna et al. | |
| 2014/0380234 | A1 | 12/2014 | Shim et al. | |
| 2015/0350031 | A1 | 12/2015 | Burks et al. | |
| 2016/0085431 | A1 | 3/2016 | Kim et al. | |
| 2017/0357434 | A1 | 12/2017 | Coffman et al. | |

OTHER PUBLICATIONS

U.S. Appl. No. 18/159,786; Final Office Action; dated Sep. 28, 2023; 18 pages.
U.S. Appl. No. 18/159,786; Non-Final Office Action dated Jun. 7, 2023; 14 pages.

* cited by examiner

*Primary Examiner* — Lincoln D Donovan
*Assistant Examiner* — James G Yeaman
(74) *Attorney, Agent, or Firm* — BakerHostetler

(57) ABSTRACT

A lighting system is provided that includes: a plurality of lighting fixtures, each lighting fixture including a processor, a memory, a communication interface and one or more light sources; and a computerized controller, including a communication interface for communicating with the plurality of light fixtures. The system is configured such that the computerized controller uploads light show programs to each lighting fixture via the communication interfaces. Each lighting fixture stores its respective uploaded light show program in the memory and the processor operates the one or more light sources according to the light show program stored in memory. The controller is further configured to send timing/clock signals to the lighting fixtures periodically so that each fixture's internal clocks are synchronized together.

30 Claims, 26 Drawing Sheets

LIGHTING SYSTEM WITH DISTRIBUTED PROGRAMMING

CROSS-REFERENCE TO RELATED APPLICATIONS

The current application claims priority to U.S. Provisional Application, Ser. No. 63/303,11 filed Jan. 26, 2022 and claims priority to U.S. Provisional Application, Ser. No. 63/306,305 filed Feb. 3, 2022, the disclosures of which are incorporated herein by reference in their entireties.

BACKGROUND

A DMX style lighting system can create light shows and use lights to do many things synchronously, or so fast in appears to be synchronous. A downside to these systems in some applications is the number of wires required to accomplish this functionality and a central processing unit required. When there is a desire to have multiple lights that are not connected with wires dedicated for high speed communication (i.e. Bluetooth, wifi, communication over power wires all function is this same manner) timing become problematic. It can also become cumbersome to require a central processing with the power to accomplish this capability.

Some lighting systems today come with preset patterns. However, those patterns are not able to be linked to one another to create a more customized light show.

For example, as shown in FIG. 8, with current systems, color boxes can be changed with an app to use different colors. In current systems, the number of color boxes are usually limited to a maximum number. The transition style is typically a global setting. Examples of transition styles could be fade off and then into the next color, or morph color into the next color, and so forth. In current systems the time spent on a color box is predefined and not able to be changed. An example of a preset pattern would be cycling through all colors of the color wheel. In that case, there could be three color boxes with red, blue and green as their settings. The transition style would be set to morph to the next color.

These settings are typically determined by a user in an app and then saved to a light or group of lights. But patterns are designed at the light level, which has significant user limitations when designing lighting systems where one wants the overall system to be coordinated into a system light show. For example, to run three different light patterns at the same time, a user would be required to send three different commands to three different sets of lights.

Additionally, the patterns will run independently in the light forward from there. When the internal clocks of each light drift over time, the patterns will be out of sync with other lights.

A DMX style lighting system can create light shows and use lights to do many things synchronously, or so fast in appears to be synchronous. The downside to these systems in some applications is the number of wires required to accomplish this functionality and a central processing unit required. When you want to have multiple lights that are not connected with wires dedicated for high speed communication (i.e. Bluetooth, wifi, communication over power wires all function is this same manner) timing become problematic. It can also become cumbersome to require a central processing with the power to accomplish this capability.

Many of the smart Bluetooth/wifi/and other landscape lights that communicate over 2 wire power come with some preset settings to allow the lights to cycle through colors. These colors and rates may be preset in the light or sent to the light from a phone/computer/or other central controller(s). Many times these commands are sent to individual lights, or groups of lights, or all lights within a system. There are a few inherent issues with this type of command and program structure.

The first issue occurs when lights or groups of lights receive a start command at different times. Therefore, from the start the patterns are off in timing sequence from one another. This can occur when the user sends the commands manually to different lights. It can also occur when the phone, computer, or controller sends the commands to different lights at different times. Another instance when this becomes a problem is when the command is sent at the same time from the sending device but because of the system infrastructure the commands are received at different times. This can occur in a wifi network where the devices might be connected to two different networks, etc.

The second issue comes from communication infrastructures such as mesh networks that use lights or other types of repeaters to relay the command from one light to another. Because the signal to start the pattern can arrive at different times, the lights start the pattern out of timing sequence.

The third issue arrives from the internal clocks within the lights themselves. Over time, the clocks in the lights will drift apart from one another. Therefore, the patterns in the lights will drift apart in time sequence as well. This issue is also applied to customized patterns in which sequences of colors and timing are linked to one another.

In addition, the current apps used for outdoor lighting with technology integrated that communicates with a phone or computer lacks in a simple user-interface that makes it simple for the user to select lights that they want to control. FIGS. 1A-1C provide an example graphical user interface for such current lighting apps. The current apps generally create a list view of the lights or a graphical icon list of lights that resemble each light. The lights can be named and/or renamed to try to reflect some adjectives so the user can remember which light is associated with that item in the list or icon. Many times the icon represents the type of light that it is being controlled. For instance, an up light may have a different icon than a path light. A group of lights can also be represented in much the same way. A group is a collection of lights that get joined together virtually. A group is represented in much the same way with an icon that represents a group.

This representation of lights and groups using icons and descriptive names has a limitation in that words must try to give the user a detailed description of a light so the user knows which light they are trying to control. The more lights, or groups of lights, that are added to a system, the more difficult the functionality gets.

In other cases, for example as shown in FIG. 2, a general picture can be used to try to represent where this light, or group of lights can be located. This represents a general area where a light or group of lights may be located. This is also the way zones are represented in a sprinkler system using a general picture of a zone that represents where the water will turn on for that zone.

The challenge with this type of design is that a general picture usually has many lights in that area that the user is trying to control. This works better for sprinkler systems than it does lighting systems because generally sprinkler systems cover a fairly big area with one zone.

When it comes to lighting, this style has a downfall because if the picture of the "area" is narrow so it shows each fixture individually, typically you cannot discern where that fixture is located within the bigger scope of the entire property. In other words, the user doesn't know which fixture they are selecting. Therefore, users do not use this picture format in this manner for smart fixtures. It is better for a system that is managed by a smart switch that controls for example, the entire front yard versus controls each fixture.

SUMMARY

In an aspect, a lighting system is provided that includes: a plurality of lighting fixtures, each lighting fixture including a processor, a memory, a communication interface and one or more light sources; and a computerized controller, including a communication interface for communicating with the plurality of light fixtures. The system is configured such that the computerized controller uploads light show programs to each lighting fixture via the communication interfaces. Each uploaded light show program includes one or more scenes, each scene including a combination of one or more settings associated with the one or more light sources for the respective lighting fixture. The uploaded light show includes one or more sequences that links one or more of the scenes together. Each lighting fixture stores its respective uploaded light show program in the memory and the processor operates the one or more light sources according to the light show program stored in memory.

In another aspect, a lighting system includes a plurality of lighting fixtures, each lighting fixture including a processor, a memory, one or more light sources and a lightshow program stored in the memory for operating the one or more light sources according to the light show program. Each lighting fixture further includes a clock or timer for which the processor times the light show program. The system is further configured such that the lighting device receives a timing command and the respective processors reset or synchronize the clock or timer upon receiving the timing command.

In another aspect, a graphical user interface for lighting control (which may be in the form of computer instructions residing on a non-transitory memory device) includes an installation image provided on the user interface screen depicting an image of an outdoor area about which lighting fixtures have been installed; and a plurality of indictor icons placed on the installation image respectively in the approximate installation locations of the lighting fixtures corresponding to actual installation locations of the lighting fixtures with respect to the structure and areas around the structure; where an interface for controlling operation of an actual lighting fixture is provided (directly, or indirectly via an additional action such as selecting a menu icon) on the graphical user interface in response to a user selecting one of the indicator icons provided on the installation image associated with the actual lighting fixture. In a detailed embodiment, the visual presentation of the indicator icon on the installation image indicates a status of the lighting fixtures, where the status can on, off, a color, and/or a brightness level. Alternatively, or in addition, the visual presentation of the indicator icon includes a graphical representation of a lighting style. Alternatively, or in addition, one or more of the indicator icons may correspond to a corresponding one or more groups of lighting fixtures. Alternatively, or in addition, a plurality of installation images and corresponding indicator icons are provided for a respective plurality of different outdoor areas in which lighting fixtures have been installed. Alternatively, or in addition, the installation image includes a photographic image of the outdoor area. Alternatively, or in addition, the installation image includes a 3-dimensional representation of the outdoor area. Alternatively, or in addition, the interface is configured to receive navigation commands from a user and manipulate navigation through the installation image in response. Alternatively, or in addition, the interface may include one or more interfaces for selecting new installation images and placing indicator icons on the selected new installation images.

DETAILED DESCRIPTION

A new graphical user interface for smart lighting control is shown in FIGS. 3-7. In this graphical user interface, a picture 30 or a similar 2D or 3D representation of the property in which smart lighting is installed (e.g., a picture or 2D/3D representation of the structure/house and surrounding landscaping about which the smart lighting is installed, the "installation image") is established in the user interface as the background upon which smart lighting fixture "icons" 32 or markers are placed to show:

Where the smart lighting fixture is located relative structure/areas depicted in the installation image 30. This is novel to the industry and has not been done before. This gives the user an entirely new user experience where they no longer need to rely on a descriptive name of the fixture or grouping.

The icon 32 or marker of the fixture or groups may indicate the status of the fixture, on, off, color, and/or brightness. This is novel in that the user now sees a graphical representation with indication of light status.

Selecting the smart light fixture or group icon 32 on the user interface takes the user to a screen/menu that allows the user to change the status of the selected fixture(s).

These graphical interface features can also be used in more complex setups like scenes where different smart lighting fixtures are different colors and allows the user to save that scene as a collective setting. This user interface allows this setup to be done easier and with much more feedback to the user as to how that scene will function. This can be done even if the computer/phone is not connected to the current system so the setting can be uploaded to the system later or used from a server on the cloud.

Figure 1A:
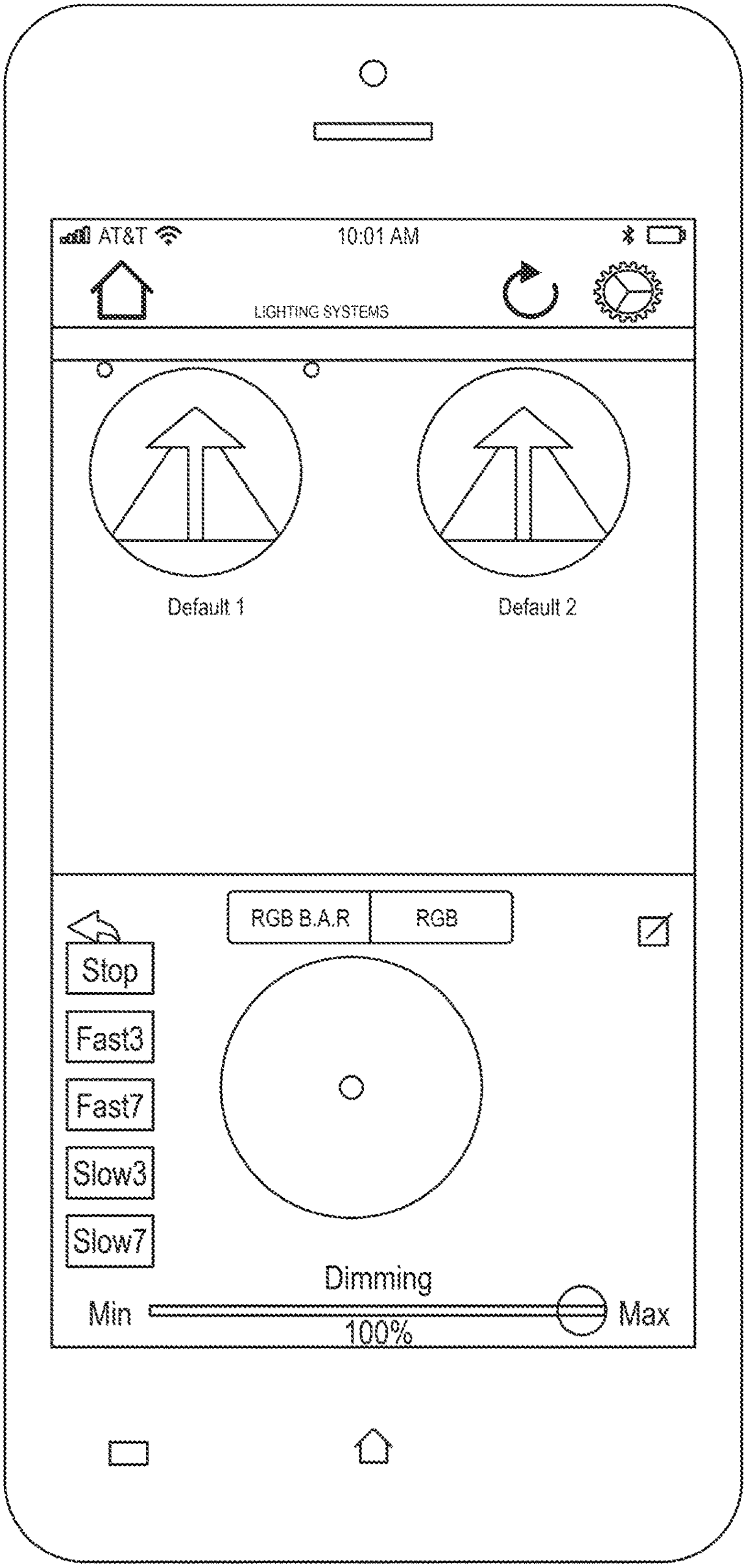
FIG. 1A PRIOR ART
FIG. 1A illustrates a prior art graphical user interface for lighting control.
Figure 1B:
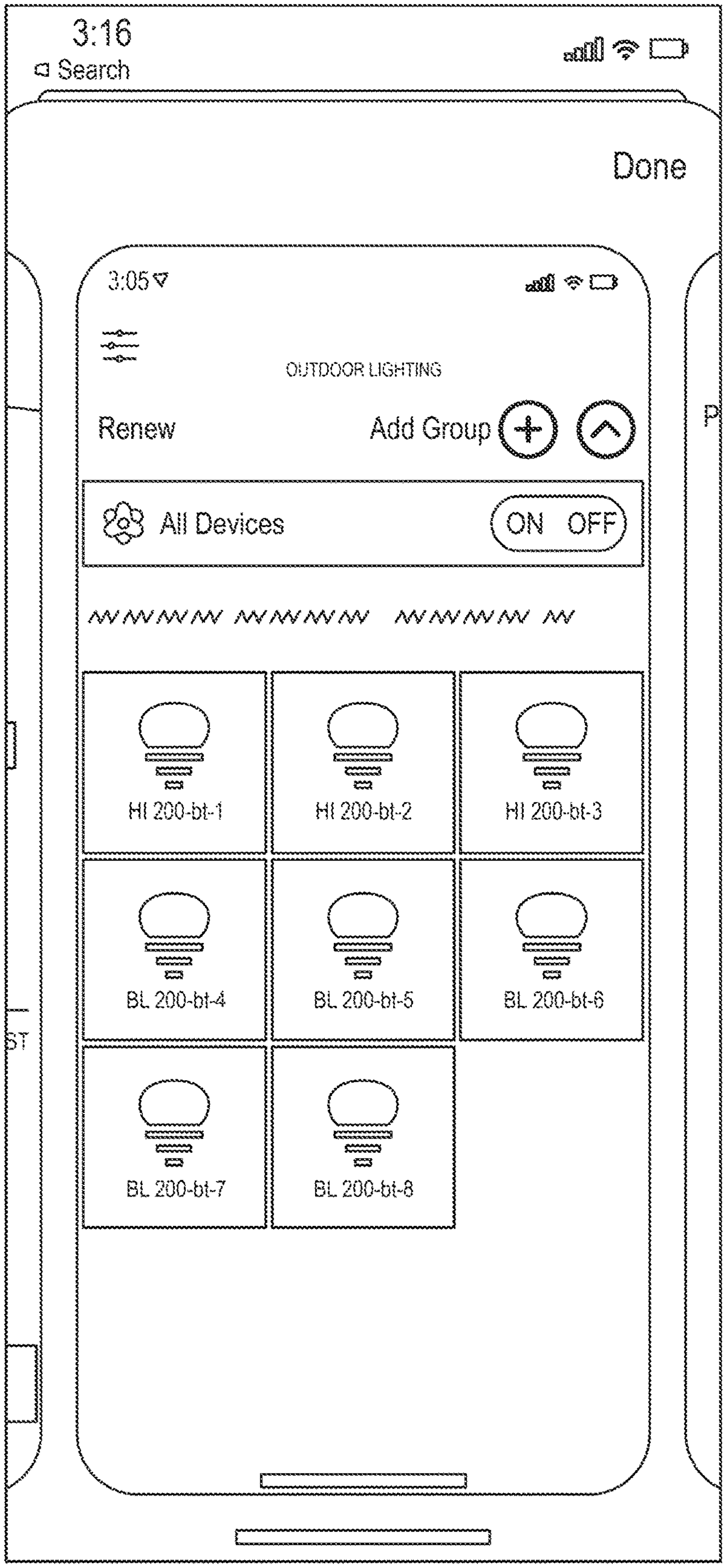
FIG. 1B PRIOR ART
FIG. 1B illustrates another prior art graphical user interface for lighting control.
Figure 1C:
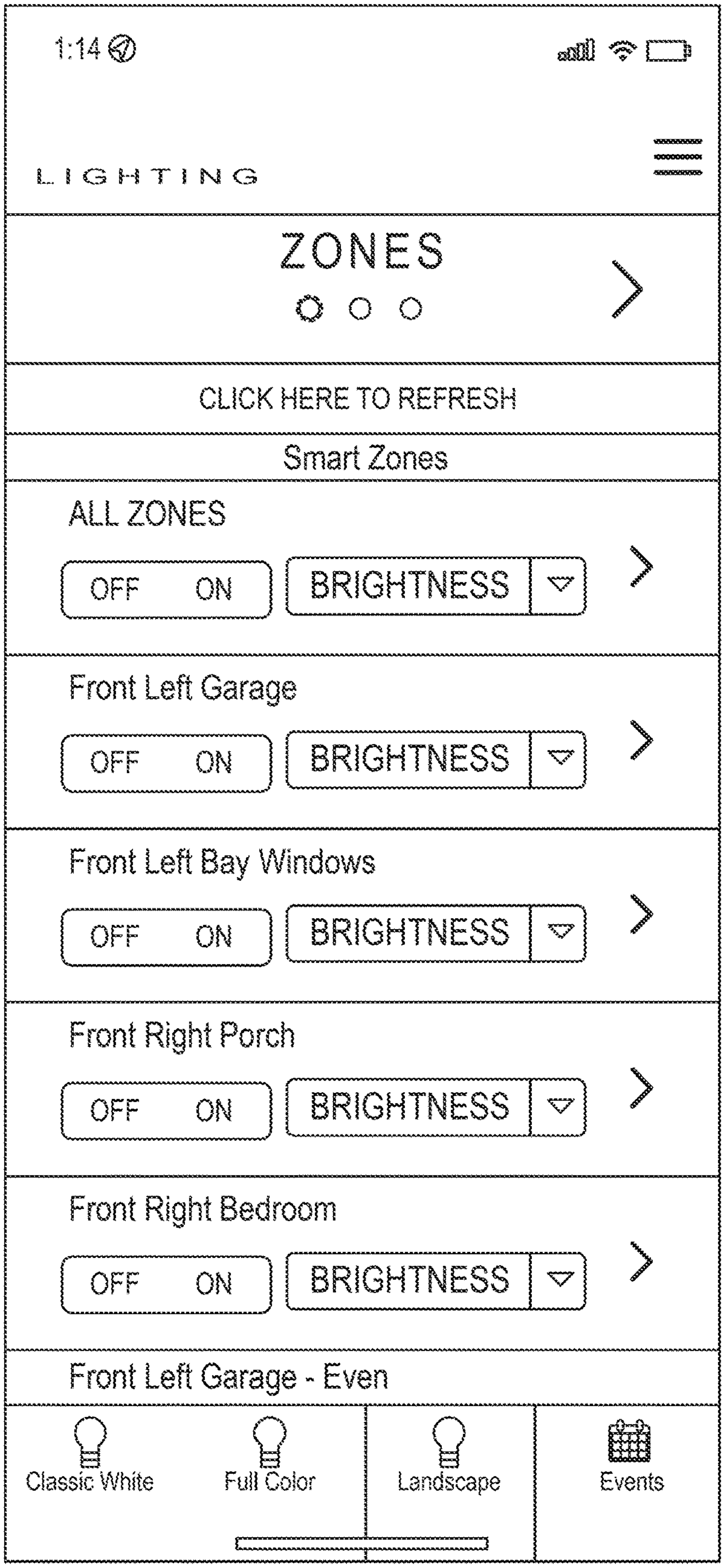
FIG. 1C PRIOR ART
FIG. 1C illustrates another prior art graphical user interface for lighting control.
Figure 2:
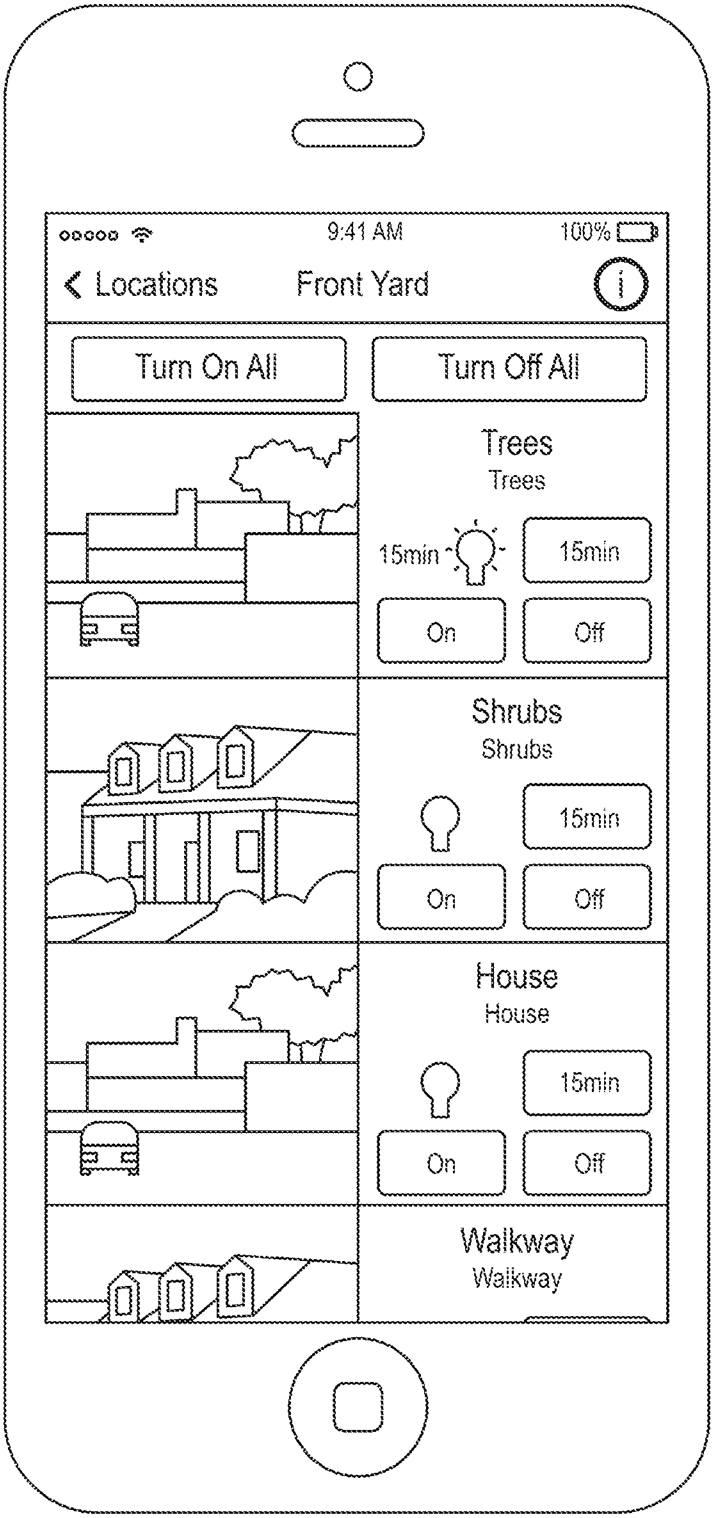
FIG. 2 PRIOR ART
FIG. 2 illustrates another prior art graphical user interface for lighting control.
Figure 3:
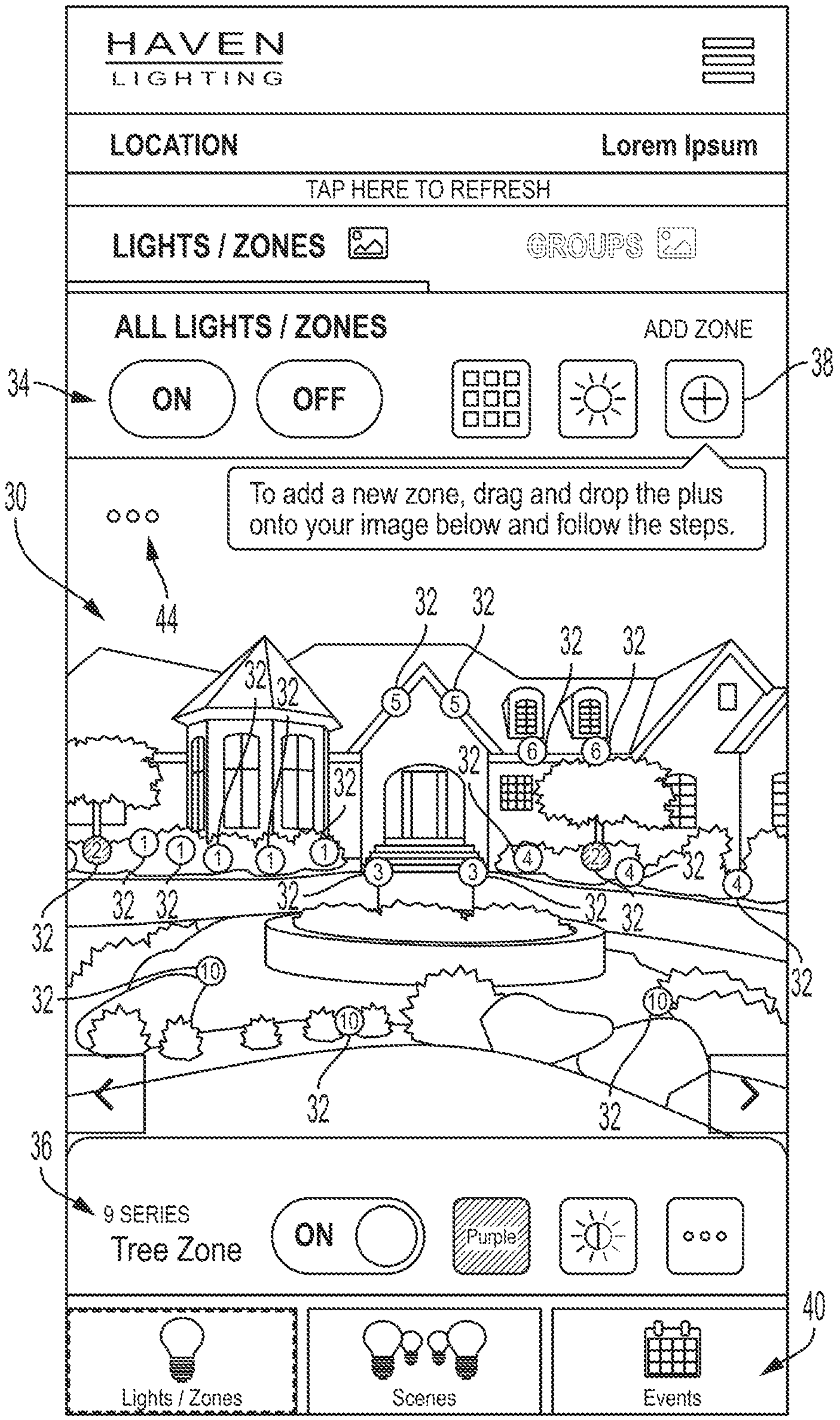
FIG. 3 illustrates an example graphical user interface for lighting control according to an exemplary embodiment.
Figure 4:
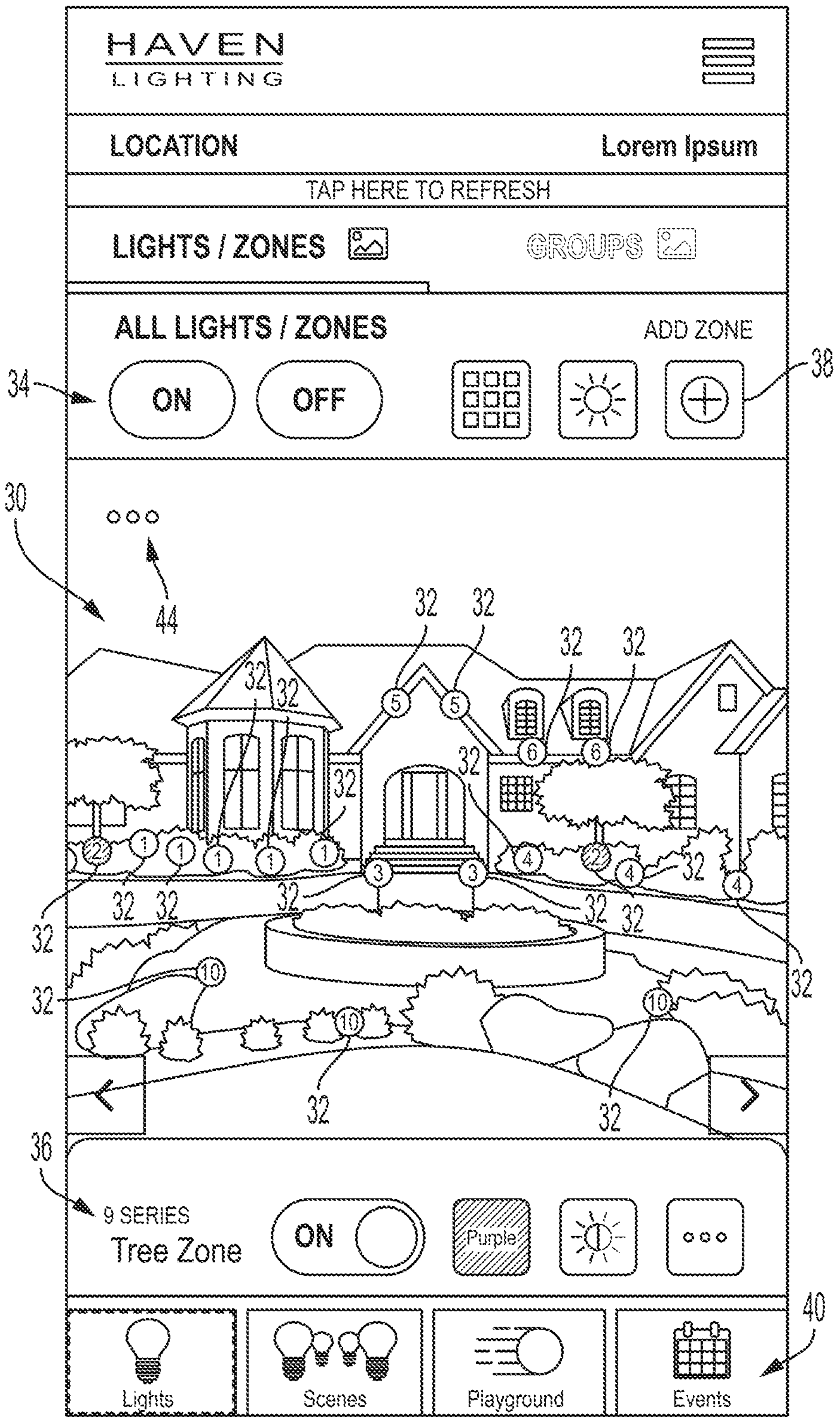
FIG. 4 further illustrates the example graphical user interface of FIG. 3.

FIGS. 3 and 4 provide an example graphical user interface for a smart lighting control app (for use on a smart phone, tablet, laptop, control panel, smart-watch, gaming console, virtual reality console or any other computerized device as known to those of ordinary skill).

As shown in FIGS. 3 and 4, a photograph, drawing, or some other appropriate 3D or 2D rendering of an area (the "installation image") 30 in which smart lighting fixtures are installed is provided. Each smart lighting fixture is shown in the installation image on the user interface screen by an indictor icon 32 that is placed on the installation image 30 in the approximate location of the actual smart lighting fixture is installed with the respect to the actual location/positioning of the smart lighting fixture in the actual area in which the smart lighting fixture is installed. Such indicator icons 32 may also reflect the current state of the actual smart lighting fixture; such as by indicating whether the light is on or off (for example, by having a bright colored icon for when the light is "on" and a darker or grey icon for when the light is "off") and/or by indicating the current color setting of the smart lighting fixture (for example, by having the bright colored icon being displayed in the approximate same color that the actual light is set to) and/or by indicating a brightness setting of the smart lighting fixture.

In an embodiment, the installation image 30 is not static and the user is able to navigate the installation image using various navigation commands or actions such as "zoom in," "zoom out," "pinch," "pan across," "flip," "rotate," "turn," "move forward/back/left/right/up/down," and the like. Such navigation capability would be substantially more powerful in the embodiment that the installation image is a 3D representation of the property in which lighting fixtures have been installed. In such a manner, the user can use various navigation tools and commands (such as, for example, common video game or VR controls) to navigate through the 3D representation in much the same manner that a video game play can navigate through a 3D video game setting.

As shown in the example user interface shown in FIGS. 3 and 4, there may be additional menus 34 with options for controlling all the lights in the area represented by the installation image (for example, the upper menu shown in FIG. 4) and there may be additional menus 36 with options for controlling selected smart lighting fixtures, zones of smart lighting fixtures or groups of smart lighting fixtures as previously selected by a user by touching one or more of the indicator icons 32 on the installation image 30 (for example, as shown in the lower menu in FIG. 4). For example, above the installation image 30, a menu bar 34 may be provided for controlling all the lights at the given location pictured in the installation image. Note that there is a button 38 in this menu bar that allows a user to add new "zones" of lights. The menu bar 36 below the installation image 30 provides options for a user to control the smart lighting fixture, zone, or group selected above in the installation image 30. As shown in the bottom-most menu bar 40, there are options for setting-up/controlling "scenes," "playgrounds" and "events" as will be described herein.

Figure 5:
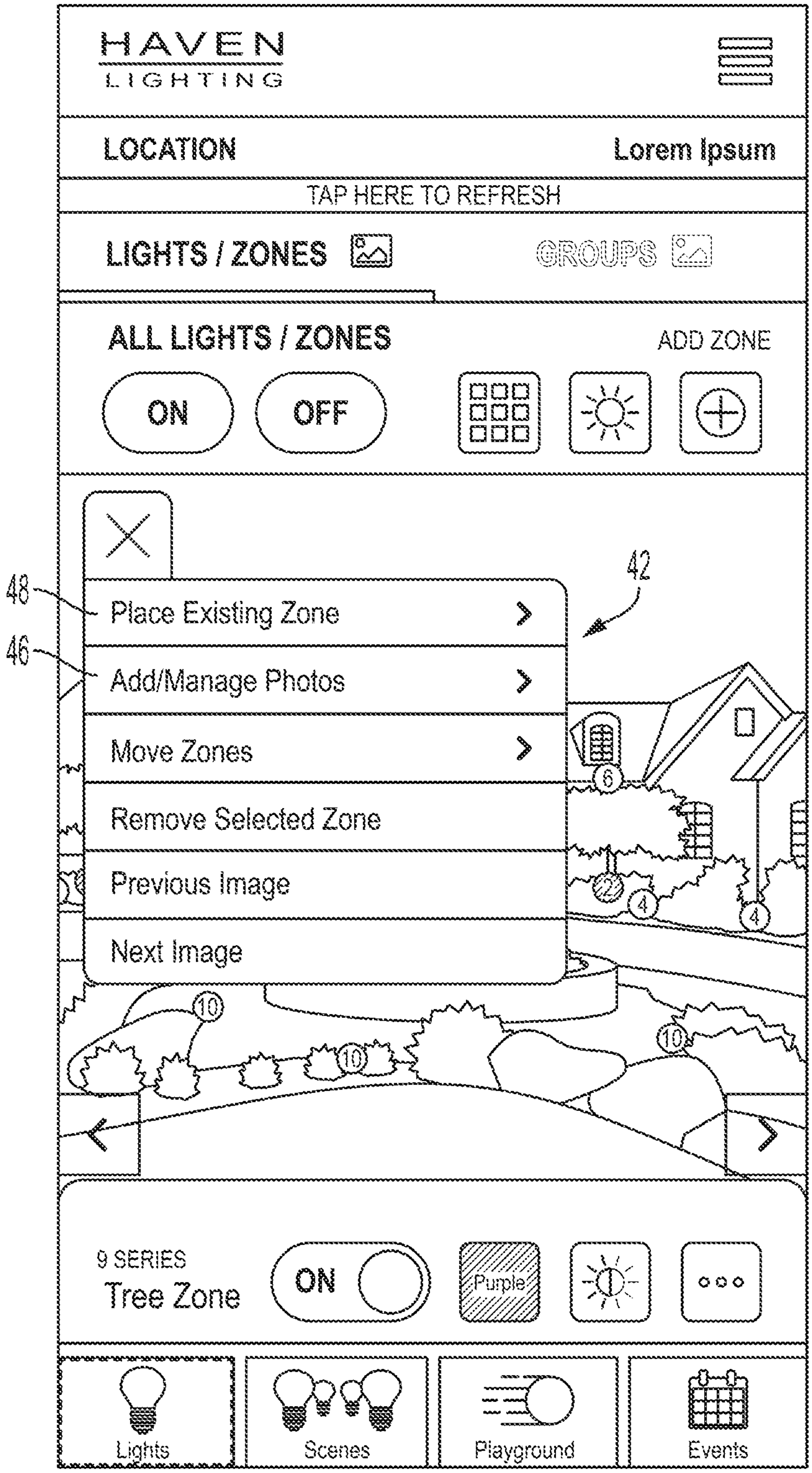
FIG. 5 further illustrates the example graphical user interface of FIGS. 3 and 4.

FIG. 5 provides an example menu 42 for setting up the installation image(s) and for managing the placement of indicator icons on the various installation image(s), which may be provided upon a user selecting the "menu" button 44 (see FIG. 4) as an example. For example, this type of user interface may allow a user to add an indicator icon 32 to an installation image 30, drag the indicator icon 32 across the installation image 30 to the appropriate location, add the indicator icon to a group or zone of icons, select available colors or other available settings for the indicator icons and so forth. This menu will also allow the user to select "add/manage photos," 46 which will provide interfaces (as described below) for managing installation images (photos in this embodiment).

Figure 6:
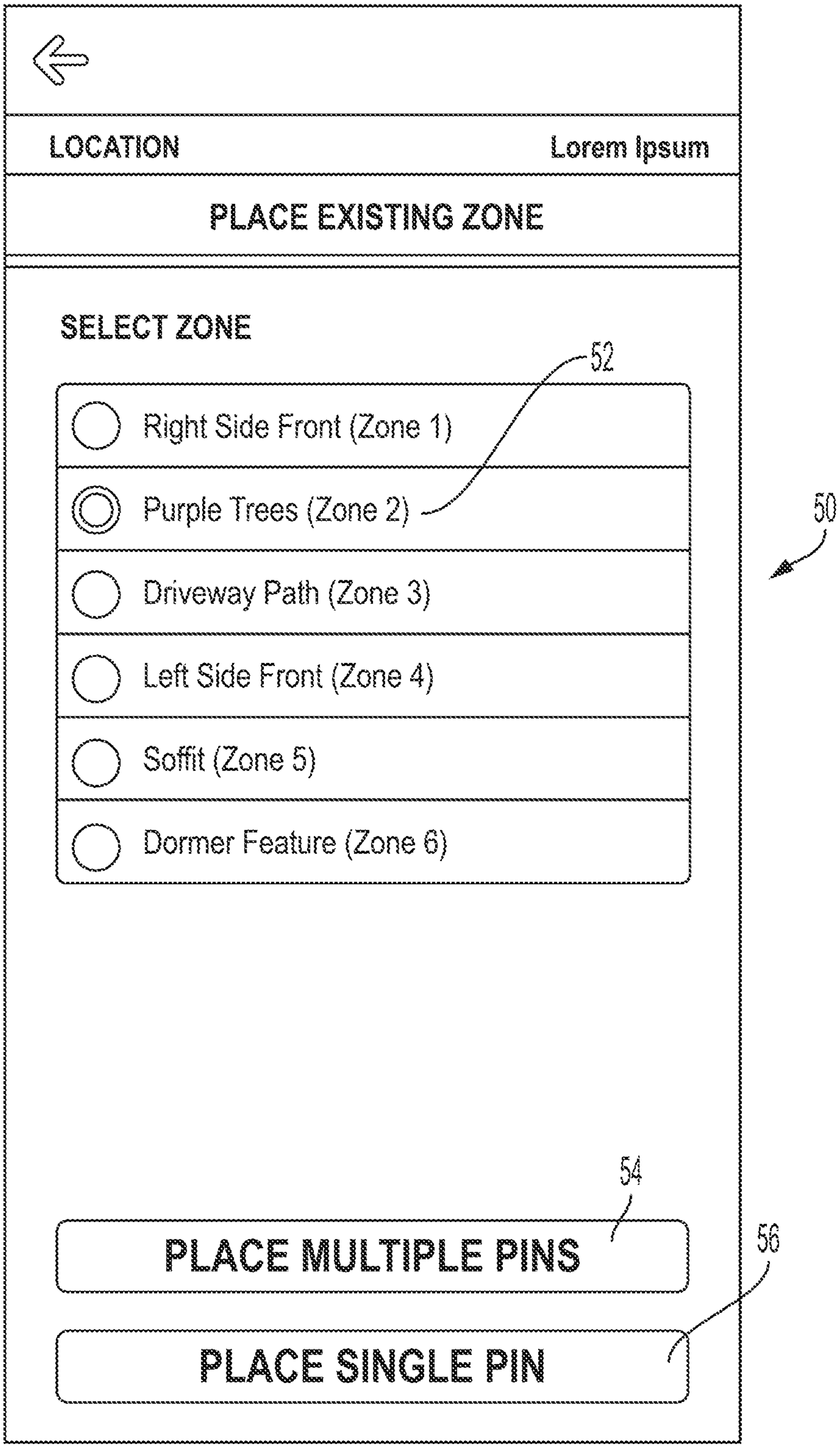
FIG. 6 further illustrates the example graphical user interface of FIGS. 3-5.

FIG. 6 provides an example interface screen 50 provided when the "Place Existing Zone" 48 or "Place Existing Lights" menu item in the example menu of FIG. 5 is selected by a user. This screen provides a list of available zones (or smart lighting fixtures) in which to include a new (or selected) indicator icon. A user can place an already existing zone as well. The menu allows for identifying multiple lighting fixtures that are in the same zone or group. In the example shown in FIG. 6, the user has toggled the "Purple Trees (Zone 2)" toggle 52 to place a new or selected indicator icon (and its associated smart lighting fixture) in the Purple Trees-Zone 2 zone. At the bottom of this interface screen, the user is provided with options to place "multiple pins" 54 or a "single pin" 56 on the installation image or in a zone. Such "pins" are going to be the indicator icons 32 on the installation image 30 when placed by the user.

Figure 7:
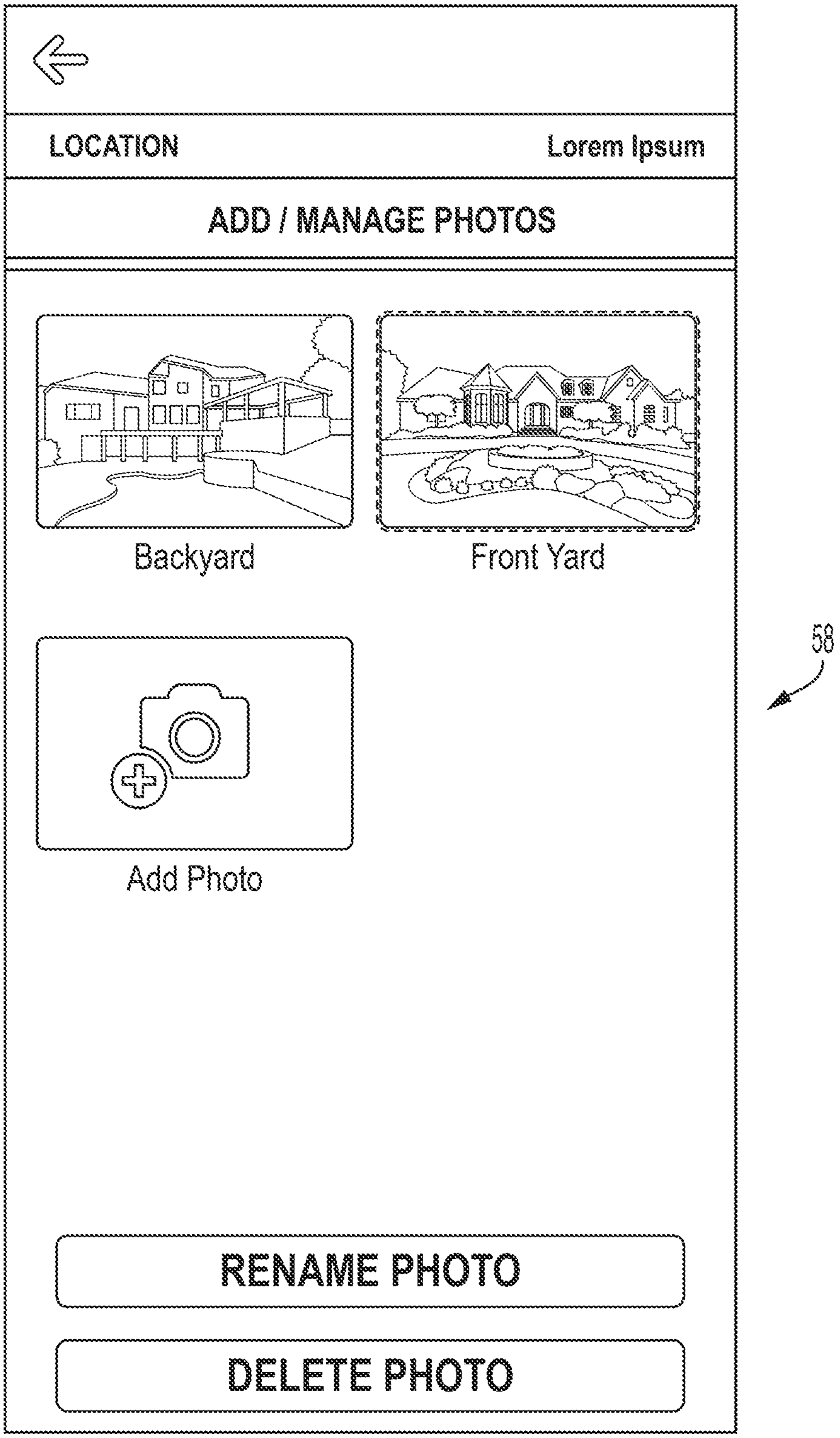
FIG. 7 further illustrates the example graphical user interface of FIGS. 3-6.
Figure 8:
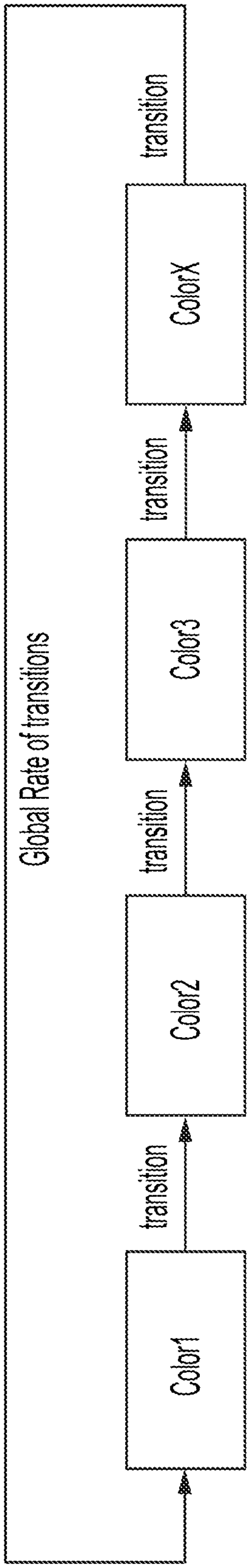
FIG. 8 PRIOR ART
FIG. 8 provides a flow diagram illustrating an example prior art light show sequence.

FIG. 7 provides an example interface screen 58 in which a user is able to add and/or manage the installation images. This screen is accessed by selecting the "manage photos" menu selection 46 in the menu shown in FIG. 5. From this interface, a user can manage existing installation images or add new installation images.

The current disclosure also provides a novel lighting system in which lighting patterns, rates, and transitions can be linked to one another and stored within the smart lighting fixtures as a distributed program. This allows for a fully customized light show with smart lighting fixtures linking different patterns, different rates, and different transition types to each other. The ability to store and execute the light shows as a program uploaded into each of the smart lighting fixtures allows synchronized functionality of a system lights show without the need for communication to the smart lighting fixtures to conduct the changes in rates and preset patterns.

This program (i.e. light show) for these systems may be made via a smartphone app, computer, or other processing unit. Once the program is created it can be wirelessly (or via wired connection in some embodiments) uploaded to the smart lighting fixtures either directly or via a central controllers or multiple controllers in a system. Because the customized light programming is distributed to each lighting device in this manner, this type of system is infinitely scalable without the need to increased central processing because the processing and program execution and pattern linking is all done within the smart lighting fixtures themselves. All this system may need to execute is:

1) To upload the program comprising the customized patterns and sequences to smart lighting fixtures in the system. Smart lighting fixtures do not need to house the same program within it. This allows for smart lighting fixtures in a system to function differently but be timed together to create a fully customized light show;
2) A start command; and
3) A timing command to synchronize the smart lighting fixtures Such distributed programs can used to establish scenes (or themes). Scenes are a system wide view of color, brightness and/or other available settings for individual light(s) or light arrays contained in each lighting device. A scene is a global view of a system that saves settings of light sources or groups of light sources as certain colors (each smart lighting fixture may have one or more light sources). For example, a scene could be called "4$^{th}$ of July" in which a group of light sources are set to red, a group of light sources are set to white and a group of sources are set to blue. As another example, a scene could be a light source or groups of light sources saved as preset patterns. For instance, in an example scene, a group of smart lighting fixtures can be set to white and another group could be set to a preset pattern that cycles through all the colors.

In an embodiment, the programs (i.e., light shows) can be synchronized to music or songs. For example, a smart-phone app that is used to prepare the program (light show) can be configured to automatically determine durations of light scenes and transitions between scenes in the light show based on an analysis of the beat and/or musical transitions in the digitized sound recording. The smart-phone app may automatically generate the light show programs and/or may provide a user to customize the light show program following the scene durations and transitions automatically determined by the music analysis. It is also within the scope of the disclosure that one of the lighting fixtures (or even separate "speaker" fixture(s)) may have a speaker and compression decoding circuitry for converting an uploaded and compressed digital song (e.g. in an MP3 or AAC format or the like) into sound for playing along with the synchronized light show. In such a case the controller may be also configured to upload the digitized songs to the speaker fixtures and "start" and timing synchronize the speaker fixtures with the smart lighting fixtures in the same manner; thus providing a light show synchronized to the uploaded music. In an embodiment, the light shows synchronized to songs may be uploaded as a play-list where several songs/light-shows are uploaded ahead of what is playing and the uploaded songs/light-shows are refreshed by subsequent uploads as the songs/light-shows have been played (removing or overwriting already-played songs, for example).

While current lighting systems are known to use scenes or themes, such current systems store such settings in the cloud, a central controller or on the computing device (smart phone). With embodiments of the current disclosure, however, the scenes can be stored in the smart lighting fixtures themselves so that the lighting system can be used to command the smart lighting fixtures to execute scenes or themes that are stored in the smart lighting fixtures. For example, a controller can send a command to the entire system to "execute scene 1" and each lighting device will know what to do. Likewise for scene 2 and scene 3 and so forth.

Figure 9:
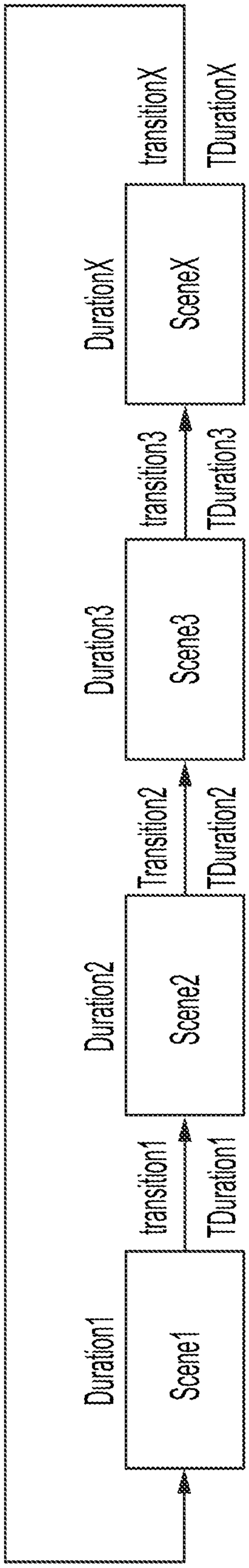
FIG. 9 provides a flow diagram illustrating an example light show sequence according to an exemplary embodiment.

FIG. 9 provides an example of lighting "sequences" according to an embodiment, which customizes lighting patterns on a system level versus a lighting device level. Using "scenes" as described above, a user could make red, white and blue lights rotate around the user's property by linking several scenes together with transitions in a repeating show. Each scene (e.g., Scene1, Scene2, Scene3 SceneX) has its own duration (e.g., Duration1, Duration2, Duration3 DurationX) and each transition has its own type (transition1, transition2, transition3 . . . transitionX) and duration (TDuration1, TDuration2, TDuration3 TDurationX), which allows the lighting system to be completely customizable. In an embodiment, the "sequences" can be uploaded into the smart lighting fixtures and executed with one user command with no variables except, possibly, for an identification of which sequence to run. Such limited communication from the controller can be advantageous in the outdoor lighting systems that do not have dedicated communication lines and large distances affect wireless communications. A user may build sequences using selected or directed scenes, transition types between scenes and durations (of either/both the scenes or the transitions), where all of these variables may be different or the same as selected by the user.

Figure 24:
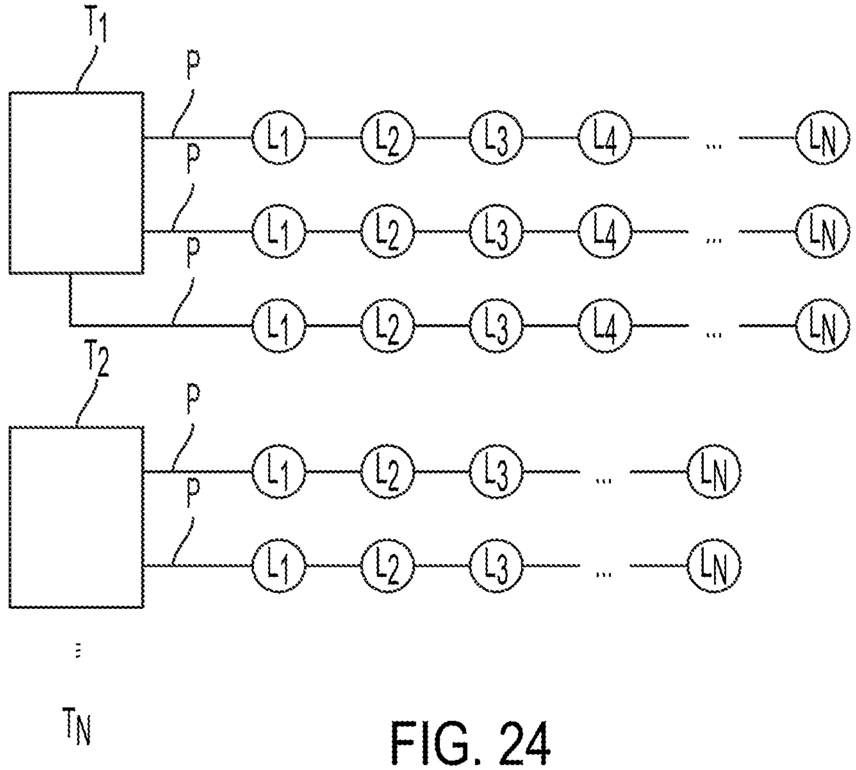
FIG. 24 provides a block diagram representation of an exemplary smart lighting system according to an exemplary embodiment.

In an embodiment, as shown in FIG. 24 smart lighting fixtures $L_1$, $L_2$, $L_3$ . . . . $L_N$ are connected to the controller(s) $T_1$, $T_2$ . . . . $T_N$ in a daisy chained fashion by power and ground wires. In such an embodiment, information (including, but not limited to, light show programs) and commands (including ID signals, timing/clock signals and/or "start" signals) are communicated from the controller(s) $T_1$, $T_2$ . . . . $T_N$ to the smart lighting fixtures $L_1$, $L_2$, $L_3$ . . . . $L_N$ over the power line P using frequency modulation with the power. In alternate embodiments, the controller(s) $T_1$, $T_2$ . . . . $T_N$ may communicate to the smart lighting fixtures $L_1$, $L_2$, $L_3$ . . . . $L_N$ using a wireless connection (e.g., Wi-Fi or Bluetooth). In other embodiments, separate data buss(es) (single or multi-wire) may be connected (such as in a spoke-and-hub fashion) to communicate the information and commands separately from the power transmission line (assuming a power transmission line is required at all—for example, the lighting fixtures may be battery powered, solar powered, etc. in various embodiments).

Figure 26:
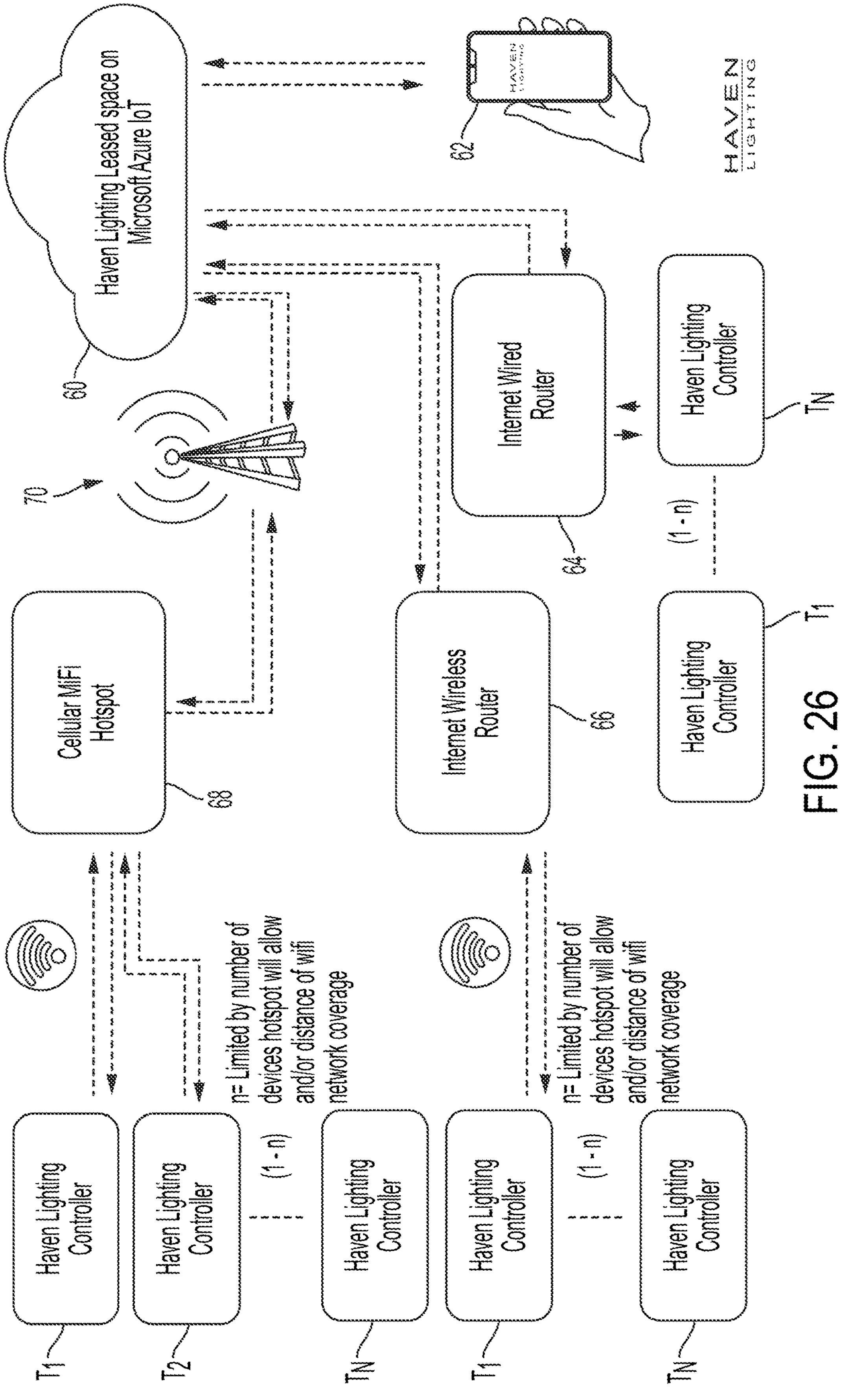
FIG. 26 provides a block diagram representation of an exemplary smart lighting system according to an exemplary embodiment.

In an embodiment, as shown in FIG. 26 the controller(s) $T_1$, $T_2$ . . . . $T_N$ may be a computerized device that communicates with the lighting fixtures and also communicates over the Internet (or some other data connection) 60 to a server that is configured to communicate (over the Internet or some other data connection) to a user's App program as discussed above with respect to FIGS. 3-7 and below with respect to FIGS. 14-23 running on a user's mobile smartphone 62 (or some other user computer such as a laptop, tablet computer, network appliance and the like), which provides a graphical user interface that allows a user to set up various lighting scenes, sequences and so forth as disclosed herein.

Figure 27:
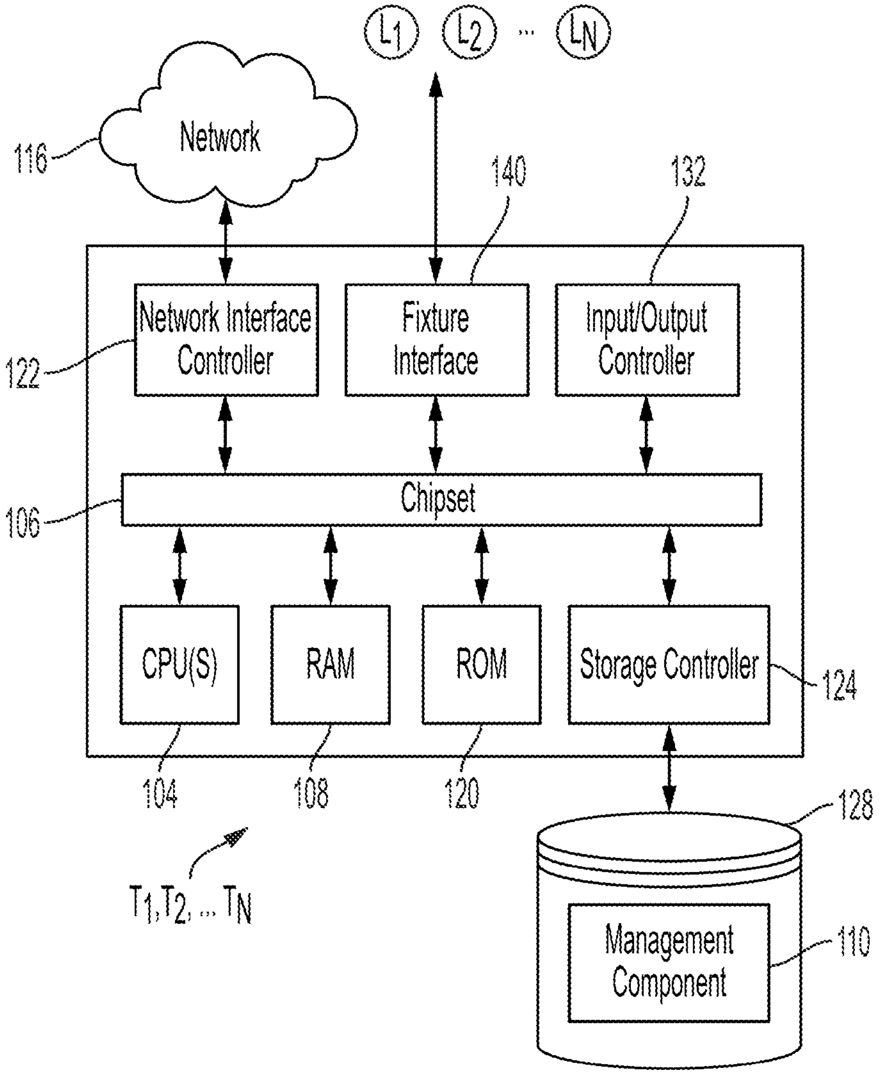
FIG. 27 provides a block diagram representation of an exemplary control device according to an exemplary embodiment.

As shown in FIG. 27, in an embodiment, the controller(s) $T_1$, $T_2$ . . . . $T_N$ may be an off-the-shelf computing device (e.g., tablet, laptop, network appliance or the like) configured with internal or external circuitry (which may be custom circuitry) 140 for facilitating communicating with the smart lighting fixtures $L_1$, $L_2$, $L_3$ . . . . $L_N$ as described using frequency modulation over the power lines, for example.

Referring back to FIG. 27, the controller(s) $T_1$, $T_2$ . . . . $T_N$ may include a baseboard, or "motherboard," which is a printed circuit board to which a multitude of components or devices may be connected by way of a system bus or other electrical communication paths. One or more central processing units (CPUs) 104 may operate in conjunction with a chipset 106. The CPU(s) 104 may be standard programmable processors that perform arithmetic and logical operations necessary for the operation of the controller(s) $T_1$, $T_2$ . . . . $T_N$. The CPU(s) 104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like. The CPU(s) 104 may be augmented with or replaced by other processing units, such as GPU(s) 105. The GPU(s) 105 may comprise processing units specialized for but not necessarily limited to highly parallel computations, such as graphics and other visualization-related processing. A chipset 106 may provide an interface between the CPU(s) 104 and the remainder of the components and devices on the baseboard. The chipset 106 may provide an interface to a random access memory (RAM) 108 used as the main memory in the controller(s) T1, T2 . . . . TN. The chipset 106 may further provide an interface to a computer-readable storage medium, such as a read-only memory (ROM) 120 or non-volatile RAM (NVRAM) (not shown), for storing basic routines that may help to start up the controller(s) T1, T2 . . . . TN and to transfer information between the various components and devices. ROM 120 or NVRAM may also store other software components necessary for the operation of the controller(s) T1, T2 . . . . TN in accordance with the aspects described herein.

The controller(s) T1, T2 . . . . TN may operate in a networked environment using logical connections to remote computing nodes and computer systems through network 116 (such as networks 60 and/or 70). The chipset 106 may include functionality for providing network connectivity through a network interface controller (NIC) 122, such as an Ethernet adapter, WiFi or MiFi chipset and the like. A NIC 122 may be capable of connecting the controller(s) T1, T2 . . . . TN to other computing nodes over a network 116. It should be appreciated that multiple NICs 122 may be present in the controller(s) T1, T2 . . . . TN, connecting the computing device to other types of networks and remote computer systems. For example, as shown in FIG. 26, the controller(s) $T_1$, $T_2$ . . . . $T_N$ may directly connected to an Internet wired router 64, via a hotspot connection to an Internet wireless router 66 and/or via a hotspot connection to a cellular MiFi Hotspot 68 which communicates to the Internet 60 via cellular network 70.

Referring again to FIG. 27, the controller(s) T1, T2 . . . . TN may be connected to a mass storage device 128 that provides non-volatile storage for the computer. The mass storage device 128 may store system programs, application programs, other program modules, and data, which have been described in greater detail herein. The mass storage device 128 may be connected to the controller(s) T1, T2 . . . . TN through a storage controller 124 connected to the chipset 106. The mass storage device 128 may consist of one or more physical storage units. A storage controller 124 may interface with the physical storage units through a serial attached SCSI (SAS) interface, a serial advanced technology attachment (SATA) interface, a fiber channel (FC) interface, or other type of interface for physically connecting and transferring data between computers and physical storage units. The controller(s) T1, T2 . . . . TN may store data on a mass storage device 128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 128 is characterized as primary or secondary storage and the like. For example, the controller(s) T1, T2 . . . . TN may store information to the mass storage device 128 by issuing instructions through a storage controller 124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The controller(s) T1, T2 . . . . TN may further read information from the mass storage device 128 by detecting the physical states or characteristics of one or more particular locations within the physical storage units. In addition to the mass storage device 128 described above, the controller(s) T1, T2 . . . . TN may have access to other computer-readable storage media to store and retrieve information, such as program modules, data structures, or other data. It should be appreciated by those skilled in the art that computer-readable storage media may be any available media that provides for the storage of non-transitory data and that may be accessed by the controller(s) $T_1$, $T_2$ . . . . $T_N$. By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion. A mass storage device, such as the mass storage device 128 depicted in FIG. 27, may store an operating system utilized to control the operation of the controller(s) $T_1$, $T_2$ . . . . $T_N$. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 128 may store other system or application programs and data utilized by the controller(s) $T_1$, $T_2$ . . . . $T_N$. The mass storage device 128 or other computer-readable storage media may also be encoded with computer-executable instructions, which, when loaded into the controller(s) $T_1$, $T_2$ . . . . $T_N$, transforms the computing device from a general-purpose computing system into a special-purpose computer capable of implementing the aspects described herein. These computer-executable instructions transform the controller(s) T1, T2 . . . . TN by specifying how the CPU(s) 104 transition between states, as described above. The controller(s) T1, T2 . . . . TN may have access to computer-readable storage media storing computer-executable instructions, which, when executed by the controller(s) $T_1$, $T_2$ . . . . $T_N$, may perform the methods described herein. A computing device, such as the controller(s) T1, T2 . . . . TN depicted in FIG. 27, may also include an input/output controller 132 for receiving and processing input from a number of input devices, such as a keyboard, a mouse, a touchpad, a touch screen, an electronic stylus, or other type of input device. Similarly, an input/output controller 132 may provide output to a display, such as a computer monitor, a flat-panel display, a digital projector, a printer, a plotter, or other type of output device. It will be appreciated that the controller(s) T1, T2 . . . . TN may not include all of the components shown in FIG. 27, may include other components that are not explicitly shown in FIG. 27, or may utilize an architecture completely different than that shown in FIG. 27.

Figure 25:
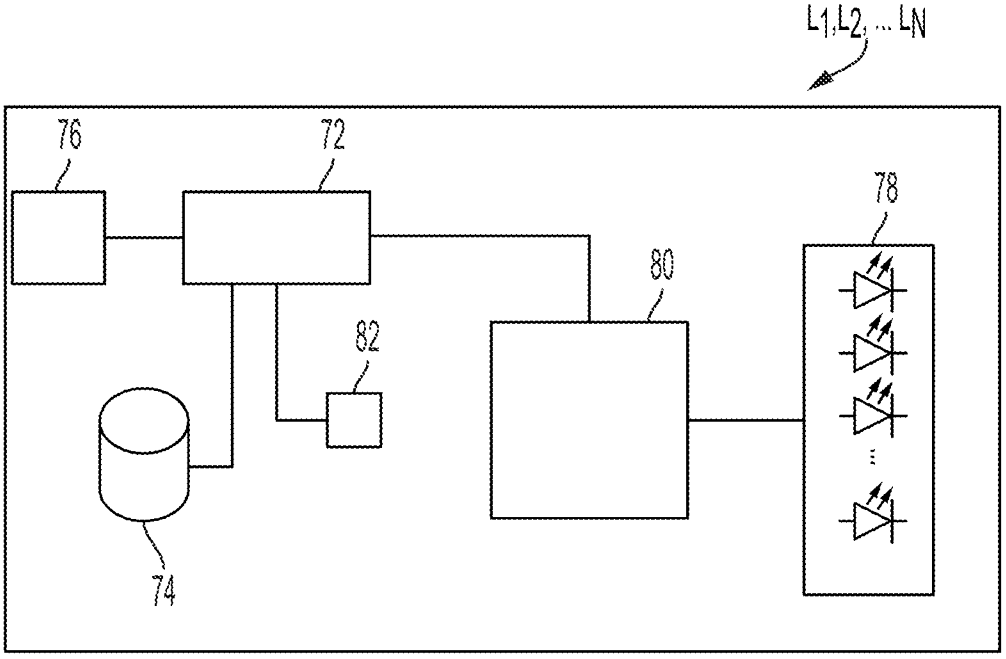
FIG. 25 provides a block diagram representation of an exemplary smart lighting fixture or device according to an exemplary embodiment.

In an embodiment, as shown in FIG. 25, each lighting fixture(s) $L_1$, $L_2$, $L_3$ . . . . $L_N$ includes a processor 72, a memory 74, a communication interface 76, and one or more light sources (such as LEDs 78). Further, the lighting fixture includes a driver, such as an LED driver 80, for actuating the plurality of LEDs 78 based on control signals provided by the processor 72. The lighting fixture(s) $L_1$, $L_2$, $L_3$ . . . . $L_N$ also include an internal clock 82 for timing and synchronizing the processing operations as disclosed herein. If the fixture is a speaker fixture as disclosed herein, the LEDs could be replaced by a speaker and the LED driver could be replaced by an MP3 decompressor and music player (or some other decompression format depending upon the format of the music file).

The system is configured such that the computerized controller(s) $T_1$, $T_2$ . . . . $T_N$ uploads light show programs to each lighting fixture(s) $L_1$, $L_2$, $L_3$ . . . . $L_N$ via the respective communication interfaces 140/76 so that the uploaded program(s) is saved by the fixture(s) $L_1$, $L_2$, $L_3$ . . . . $L_N$ on memory 74 and thereafter may be acted upon and executed by the processors 72. Each uploaded light show program may include one or more scenes, each scene including a combination of one or more settings associated with the one or more light sources for the respective lighting fixture. The uploaded light show may include one or more sequences that links one or more of the scenes together. Each lighting fixture stores its respective uploaded light show program in the memory 74 and the processor 72 operates the one or more light sources 78 according to the light show program stored in memory 74. Each lighting fixture may further include a clock or timer 82 for which the processor 72 times the light show program. The system is further configured such that the lighting device receives a timing command and the respective processors reset or synchronize the clock 82 or timer upon receiving the timing command.

Figure 10:
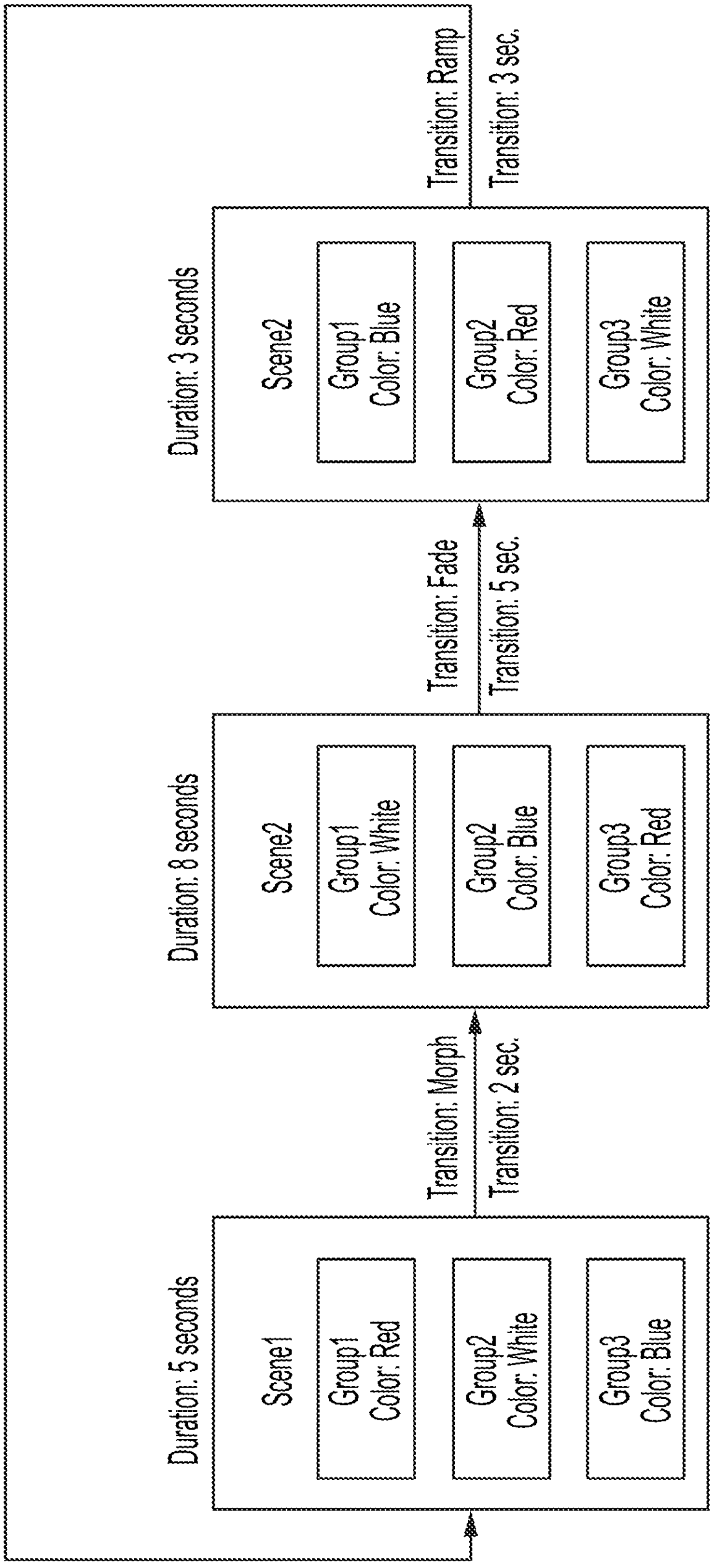
FIG. 10 provides a flow diagram illustrating another example light show sequence according to an exemplary embodiment.

FIG. 10 provides a specific example of an uploaded repeating light show sequence comprising three scenes (Scene1, Scene2, and Scene3) for each group of smart lighting fixtures (Group1, Group2 and Group3), and including durations of each scene and transitions types and transition durations between the scenes. Of course, it will be appreciated that a "group" may contain a single smart lighting fixture or a plurality of smart lighting fixtures. Transition types can include transitions such as "morph", "fade", "ramp", "blend", "none" and so forth.

Figure 11:
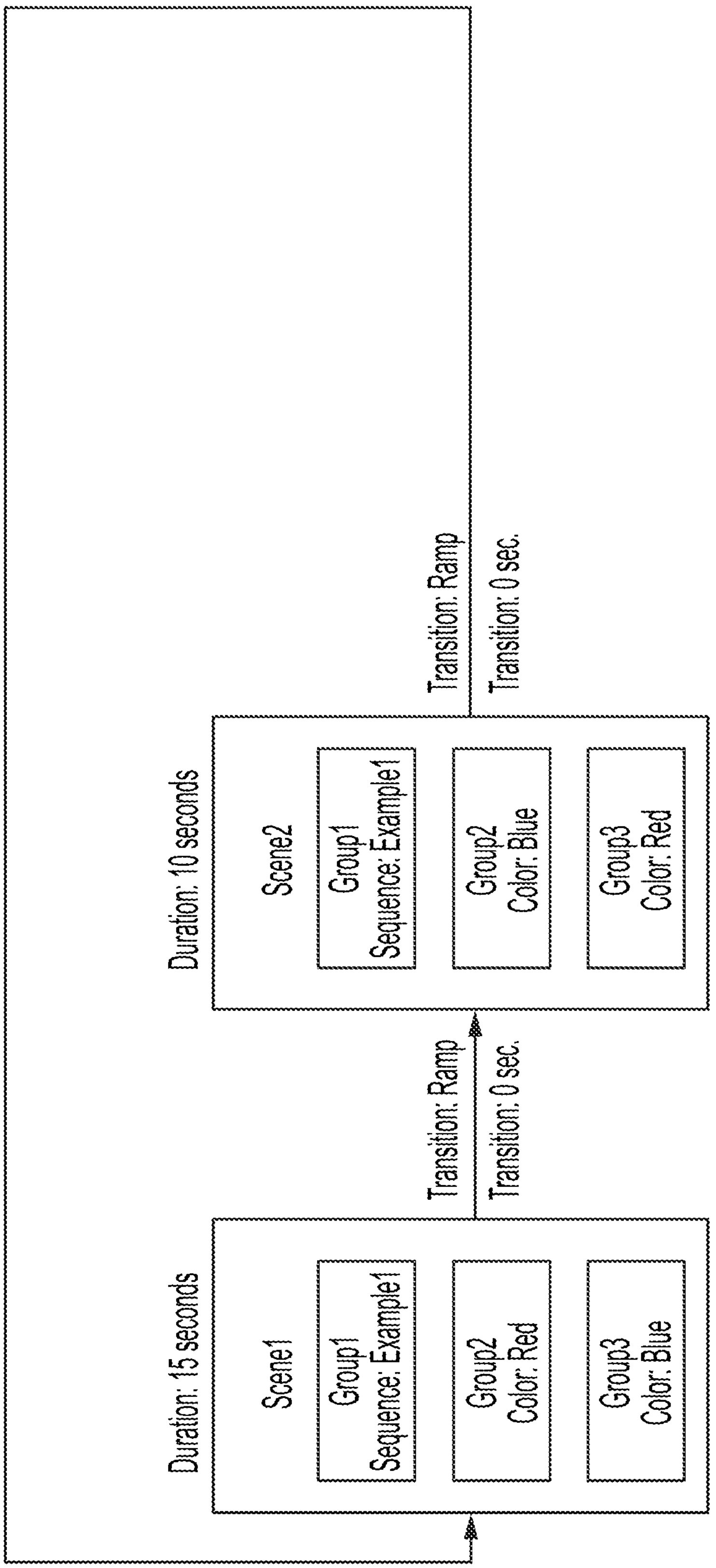
FIG. 11 provides a flow diagram illustrating another example light show sequence according to an exemplary embodiment.

FIG. 11 provides an example of uploaded programs that include "nested" sequences. In the example of FIG. 11, a sequence is provided that includes two scenes (Scene1 and Scene2) for three groups of smart lighting fixtures (Group1, Group2, Group3) and including scene durations, scene transitions and transition durations. As can be seen in FIG. 11, in Scene1 and Scene2, the Group1 smart lighting fixtures are programed to perform the sequence of FIG. 10 ("Example 1"), thereby nesting the sequence of FIG. 10 ("Example 1") into the sequence of FIG. 11.

Figure 12:
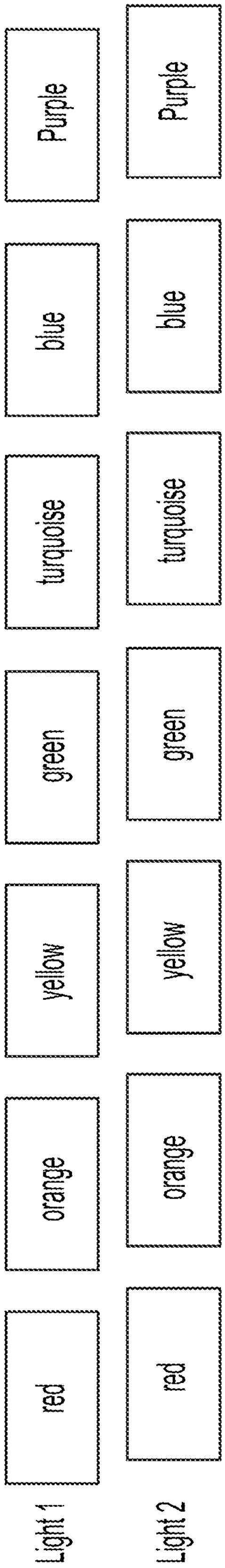
FIG. 12 provides an illustration of a light show sequence without clock synchronization among the light fixtures according to an exemplary embodiment.
Figure 13:
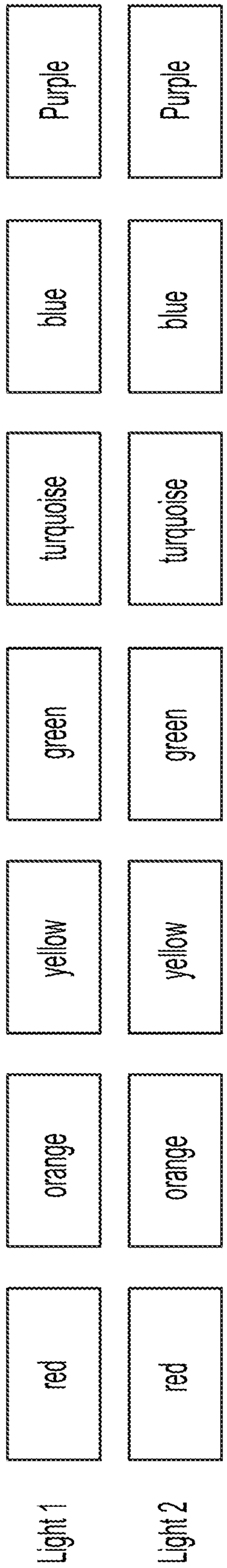
FIG. 13 provides an illustration of a light show sequence using clock synchronization among the lighting fixtures according to an exemplary embodiment.

In an embodiment, a way to synchronize the smart lighting fixture(s) $L_1$, $L_2$, $L_3$ $L_N$ (and speaker fixtures if present) after they are told to execute a pattern is to send a "sync now" or a "start at a specific time" timing command from the controller to each of the smart lighting fixtures. This allows all the smart lighting fixture(s) $L_1$, $L_2$, $L_3$ . . . . $L_N$ to sync at the time of receipt. This can be used to synchronize all the smart lighting fixtures at one starting point. However, without an adjustment based on a time synchronization, the light patterns could eventually drift apart over time as shown in FIG. 12. An embodiment could periodically send this "sync" or "start" command based on the rate/period of the pattern to keep the clocks 82 in sync without a noticeable "jump" in functionality. As such, there will be substantially reduced (if not eliminated) drift, as shown in FIG. 13. This broadcast timing command could be sent from the controller(s) T1, T2 . . . . TN; alternatively, the broadcast command could be sent from one or more of the smart lighting fixtures themselves (or may even be sent by some other device(s) depending upon the configuration of the system).

In an embodiment an outdoor lighting system is provided in which the preset or customized patterns that run inside the smart lighting fixtures are based on an absolute or relative time base. This time allows for internal calculations to occur within the lighting fixture(s) $L_1$, $L_2$, $L_3$ . . . . $L_N$ to determine the point the sequence should be at any given time. This allows the smart lighting fixtures to stay in proper sequence forever. All that needs to occur is that the time/clock 82 inside the lighting fixture (and speaker fixture if present) be updated on a periodic basis. Even smart lighting fixtures that drift apart from the last timing update, can automatically synchronize to the rest of the system once it gets an updated time base or clock signal. This time base can from many origins. It can be from controller(s), phone(s), computer(s), a cellular (or other network) or the internet. Once the time is updated, the smart lighting fixtures can determine the point in the pattern it should be at that particular time. This allows all smart lighting fixtures to be synchronized at all times forever. It also allows a lighting device to re-synchronize itself at anytime should it be off for any reason once it receives the time base.

This time synchronization can be used in systems that contain multiple controllers $T_1$, $T_2$ . . . . $T_N$ as long as the controllers (phones, computers, etc.) themselves are synchronized together. This can be accomplished through a wireless transmitted signal between controllers or using an internet connection and algorithms to keep time extremely accurate.

Figure 14:
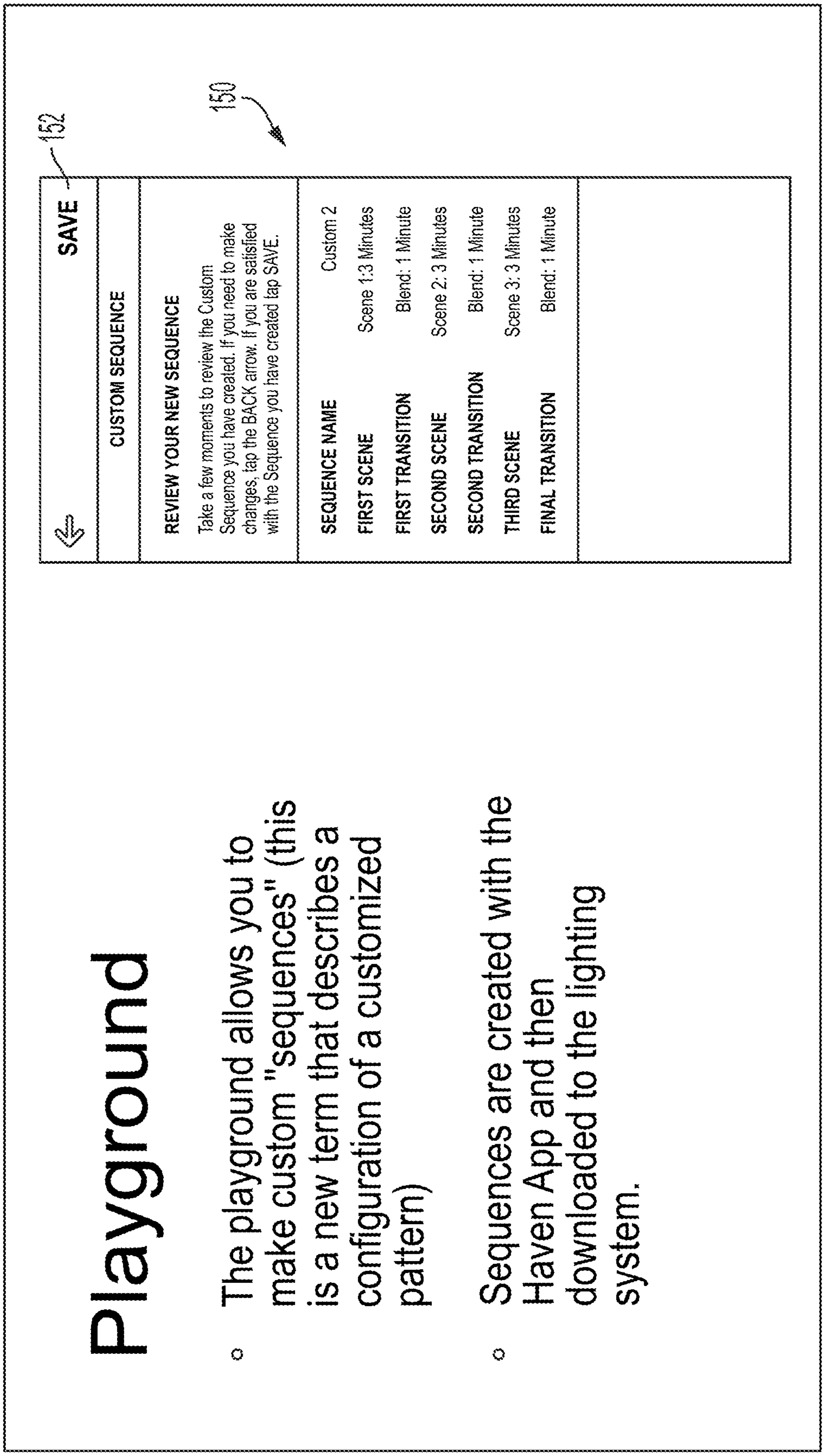
FIG. 14 illustrates and discusses another example graphical user interface according to an embodiment.
Figure 21:
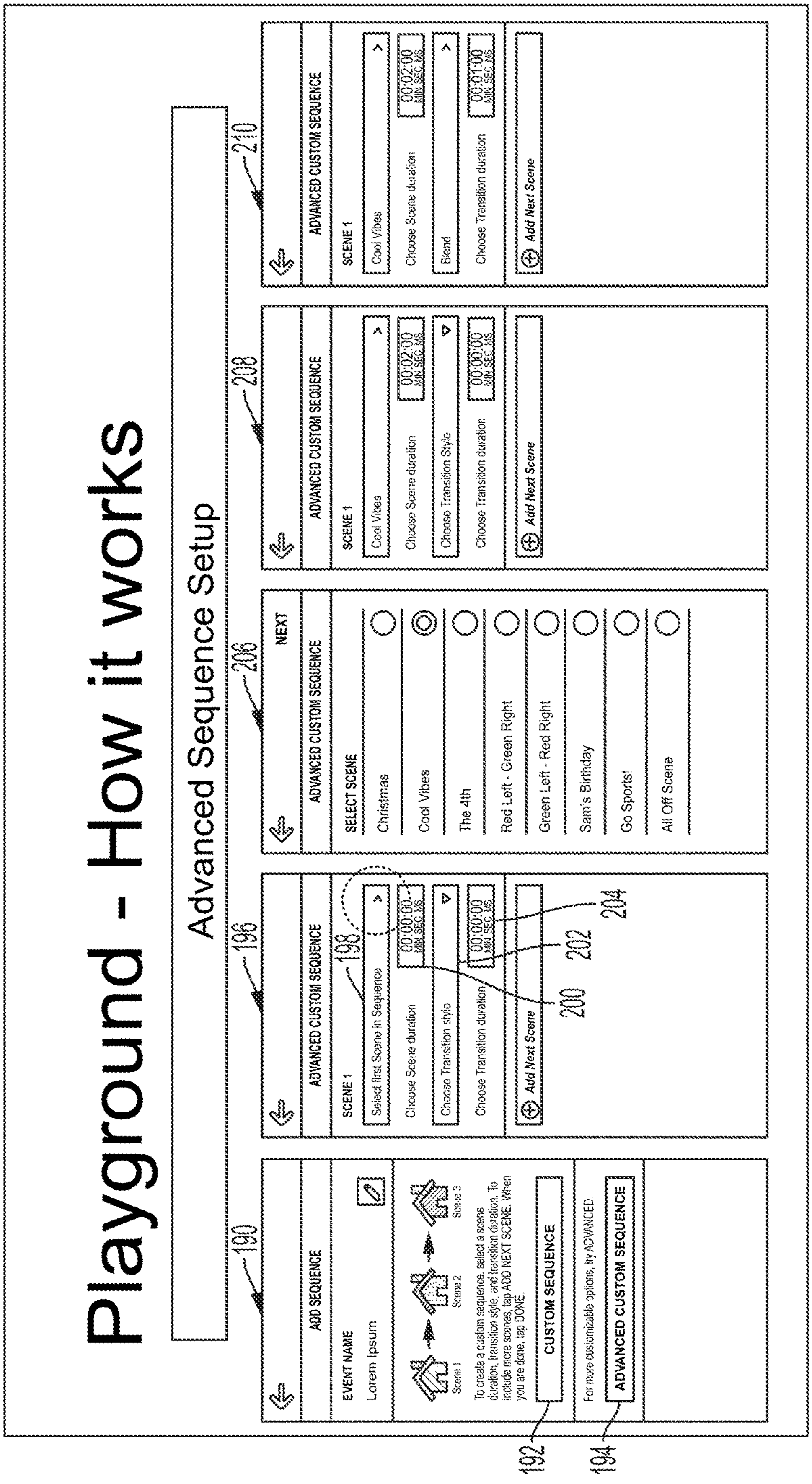
FIG. 21 further illustrates a series menu interfaces of the graphical user interface of FIGS. 14, 18, 19 and 20 illustrating a flow of steps for using the graphical user interface of FIGS. 14, 18 19 and 20 for setting up a light show sequence.
Figure 22:
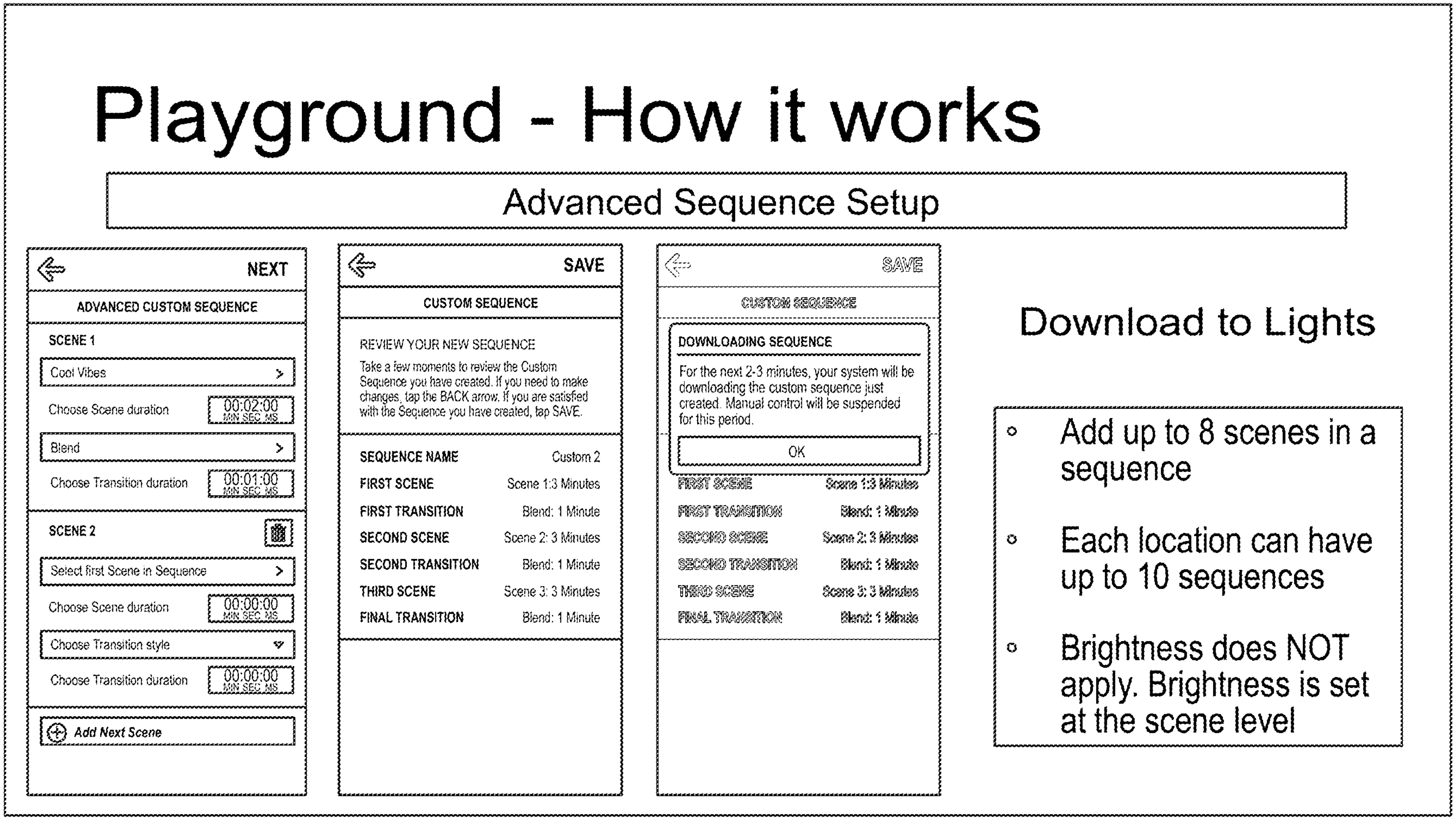
FIG. 22 further illustrates a series menu interfaces of the graphical user interface of FIGS. 14, 18, 19, 20 and 21 illustrating a flow of steps for using the graphical user interface of FIGS. 14, 18 19, 20 and 21 for setting up a light show sequence.
Figure 23:
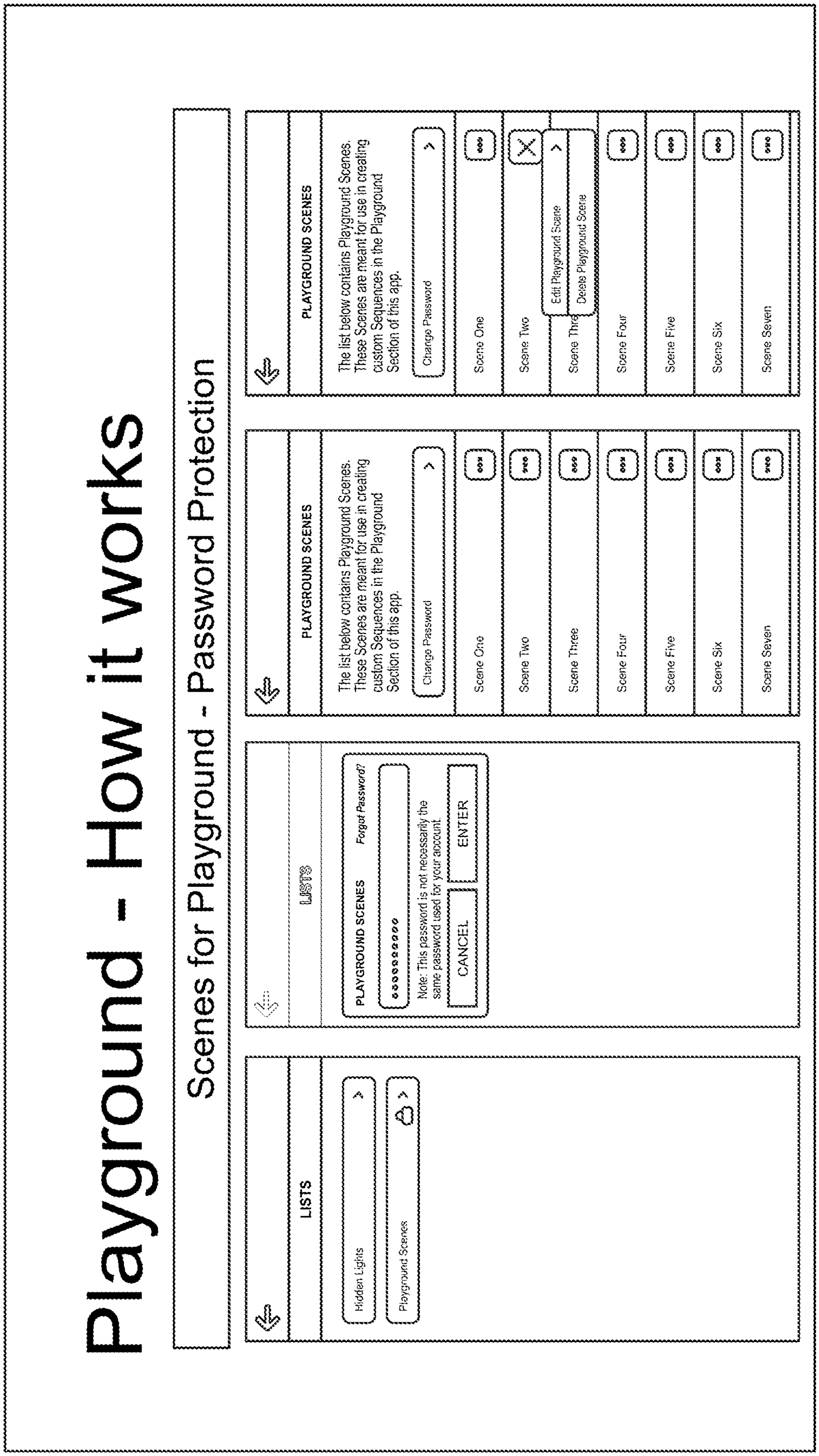
FIG. 23 illustrates a series of menu interfaces for setting up password protection according to an exemplary embodiment.

FIGS. 14 through 23 provide additional images and descriptions of a specific embodiment to be commercialized as "Playground." FIGS. 14 and 23 also provide exemplary graphical user interfaces for a smartphone, tablet, laptop or other computing device that can be used to set up scenes, set up sequences, upload programs to the smart lighting fixtures, and more.

FIG. 14 shows an example screen on the App interface 150 in which a user is asked to review their new custom sequence, and provided a "save" button 152 allowing the user to initiate the system to save the custom sequence. Upon saving the custom sequence the sequence program(s) associated with the new custom sequence are then uploaded to the smart fixture devices by the controller as described herein.

Figure 15:
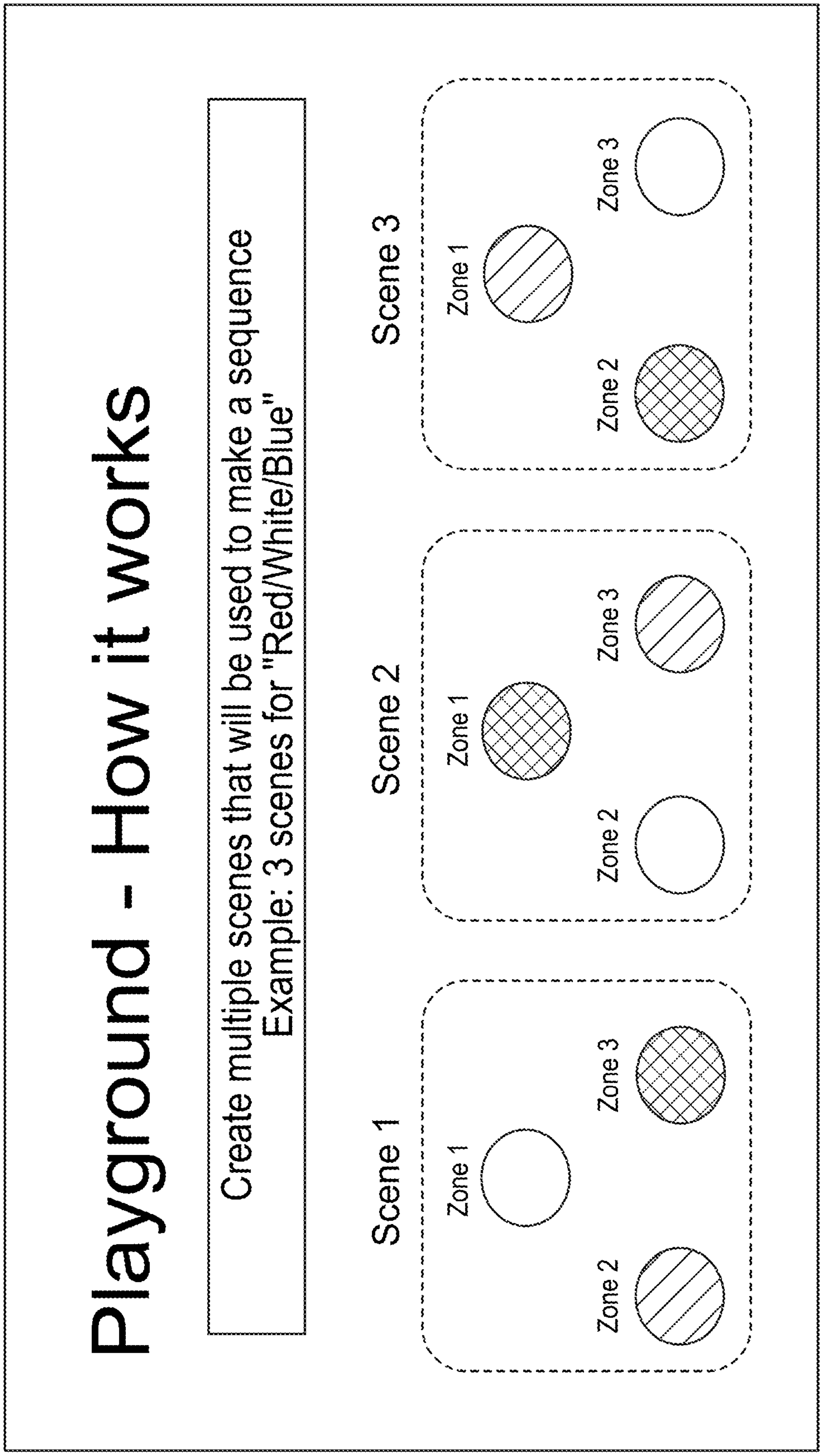
FIG. 15 illustrates an example light show sequence that can be set up using the graphical user interface of FIGS. 14, 18 19, 20 and 21.

FIG. 15, provides a visual example of three scenes ("Scene 1," "Scene 2," and "Scene 3") that may be part of such a custom sequence. Each scene involves three zones of smart lighting fixtures ("Zone 1," "Zone 2," and "Zone 3"). As shown in FIG. 15, this custom sequence will be set up as follows:

Scene 1: Zone 1 emits white lighting; Zone 2 emits blue lighting and Zone 3 emits red lighting;

Scene 2: Zone 1-red; Zone 2-white; and Zone 3-blue;

Scene 3: Zone 1-blue; Zone 2-red; and Zone 3-white.

Figure 16:
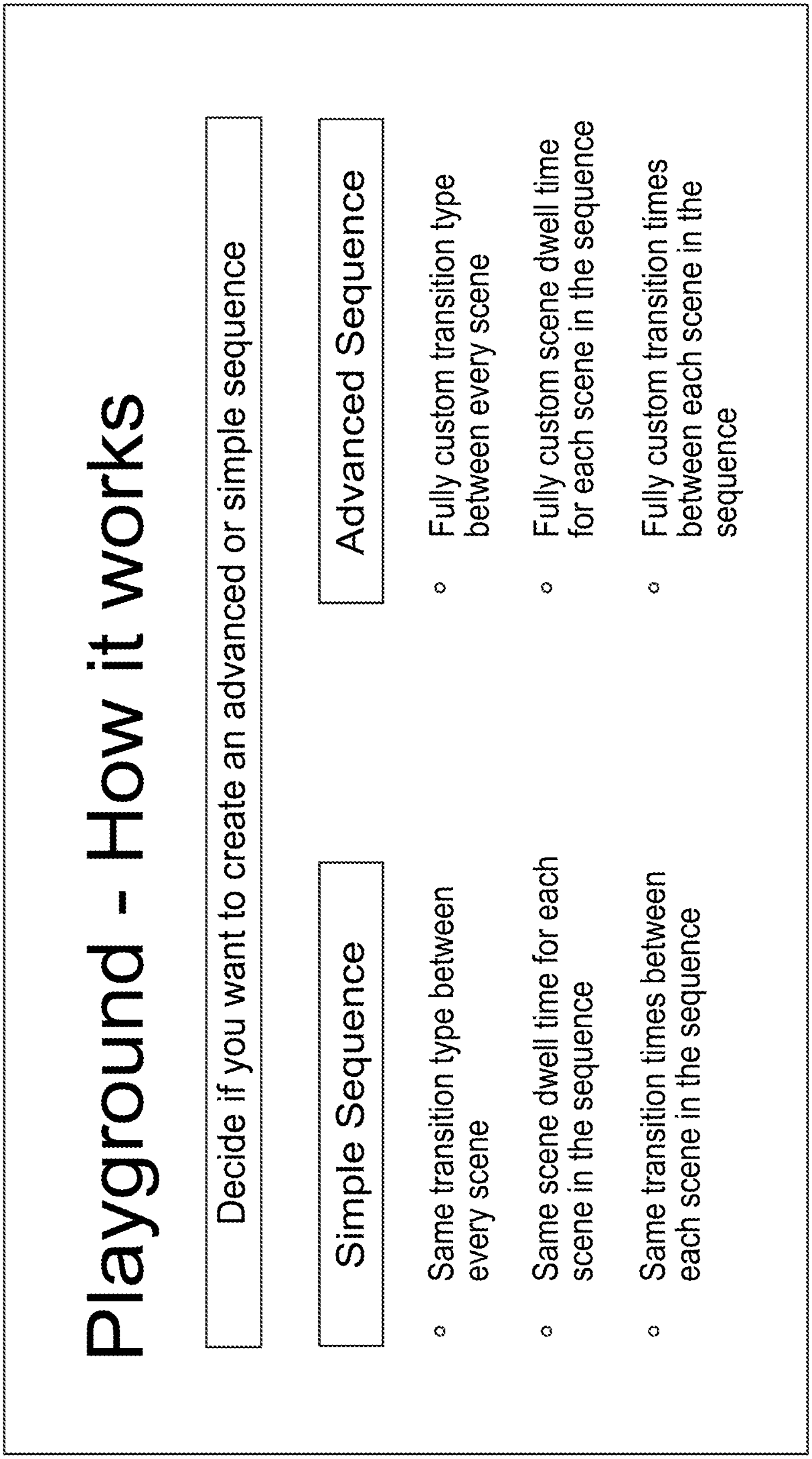
FIG. 16 describes types of light show sequences that can be set up using the graphical user interface of FIGS. 14, 18 19, 20 and 21.

FIG. 16, illustrates the various types of transitions/sequences that could be programmed between the scenes. For example, a simple sequence may have the same transition type, scene dwell type and transition time between each scene in the sequence. On the other hand, an advanced sequence may have fully custom transition types, scene dwell times and transition times between each scene in the sequence.

Figure 17:
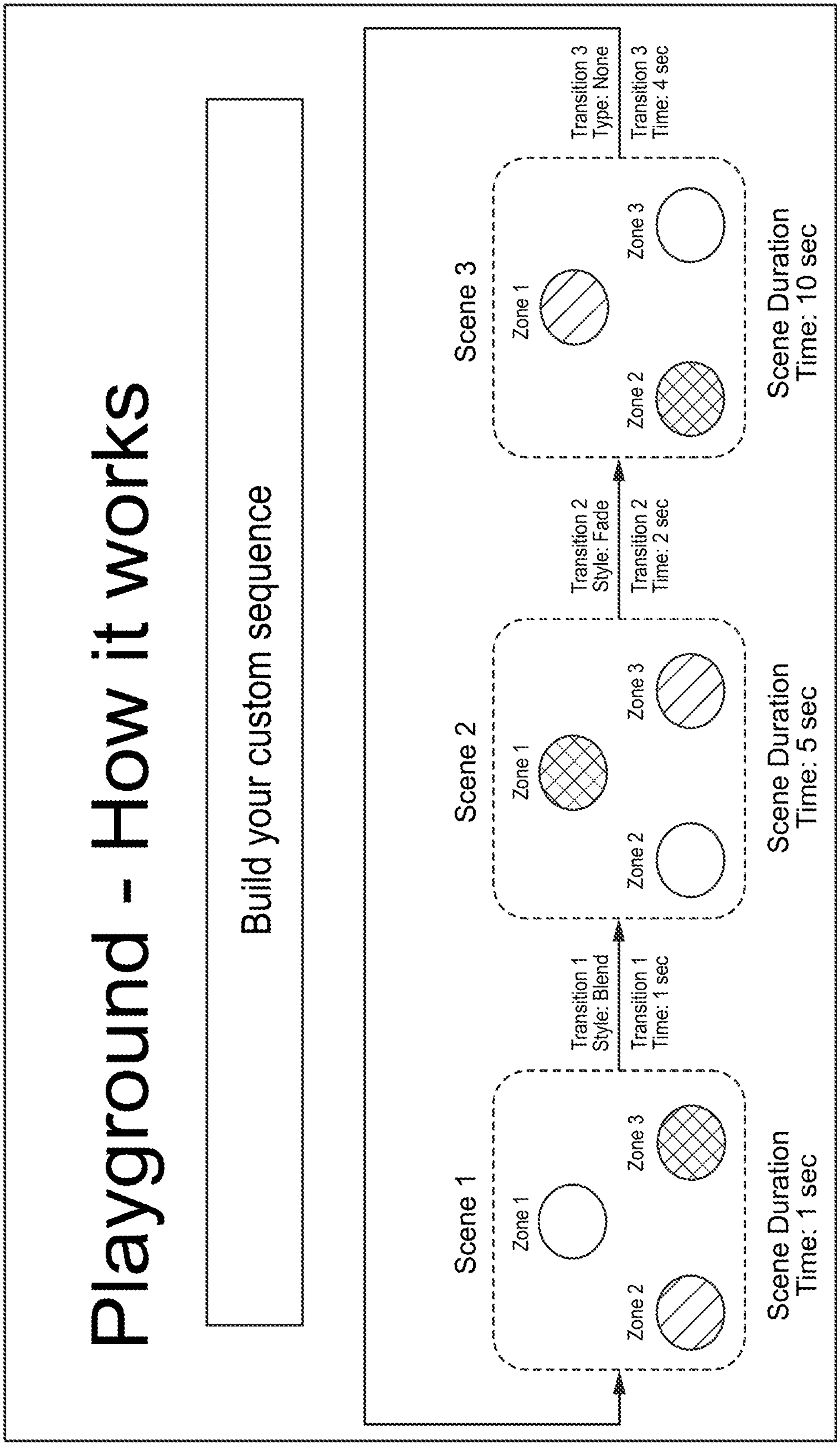
FIG. 17 illustrates another example light show sequence that can be set up using the graphical user interface of FIGS. 14, 18 19, 20 and 21.

FIG. 17, illustrates an example custom advanced sequence that has been programmed between the three scenes set up in FIG. 15. Scene 1 has a duration of one second and transitions to Scene 2 in one second with a "Blend" transition type; Scene 2 has a duration of five seconds and transitions to Scene 3 in two seconds with a "Fade" transition type; and Scene 3 has a duration of ten seconds and transitions back to Scene 1 over four seconds with no transition type.

Figure 18:
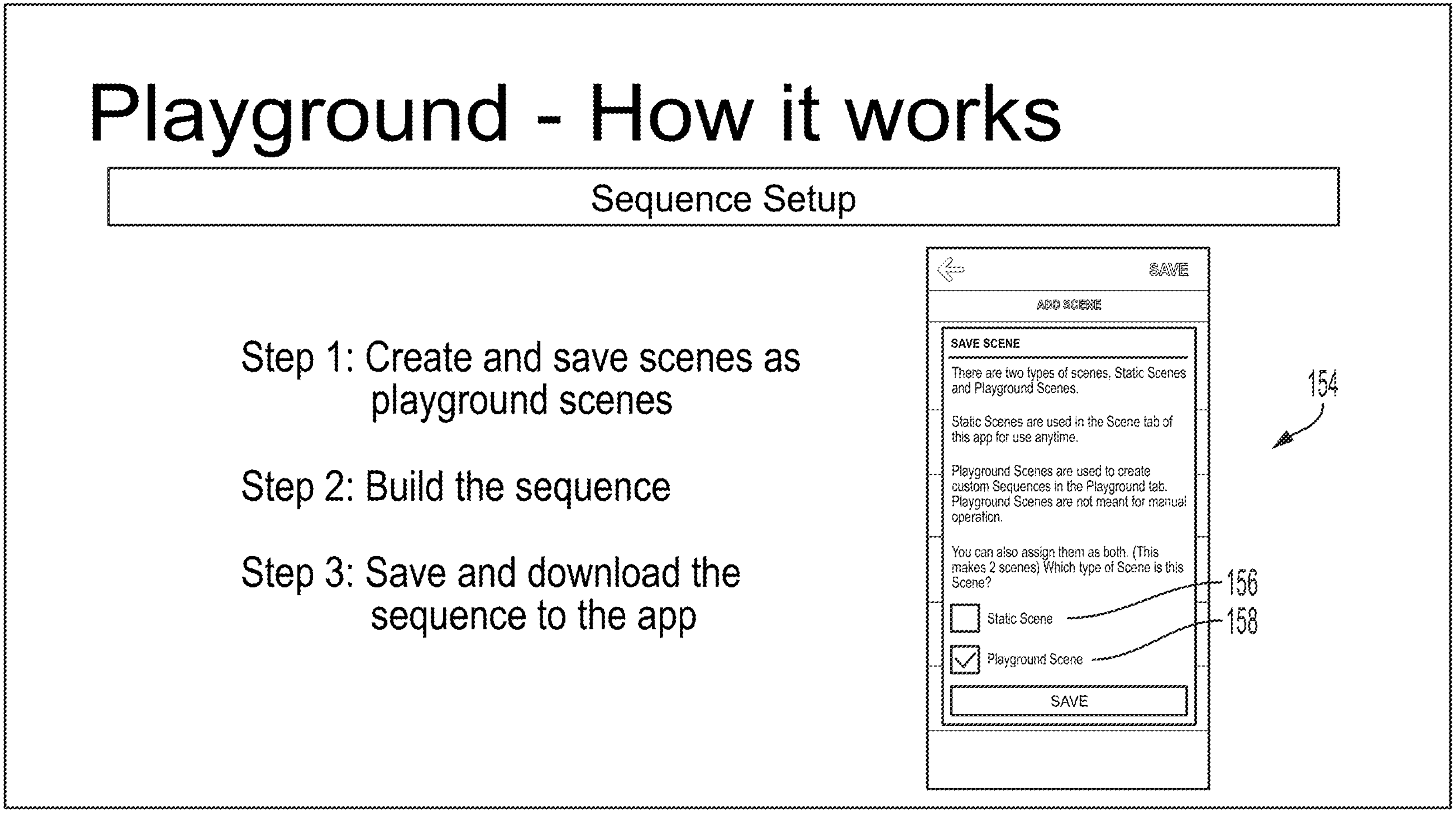
FIG. 18 further illustrates the example graphical user interface of FIG. 14 and list steps for operation according to an example method for setting up a light show sequence.

FIG. 18 shows an example user interface screen 154 in the App in which a user is permitted to select between a static scene 156 for the system or a "playground" scene 158 for the system. As indicated, the playground scene setup allows the user to create "custom sequences" such as those described above.

Figure 19:
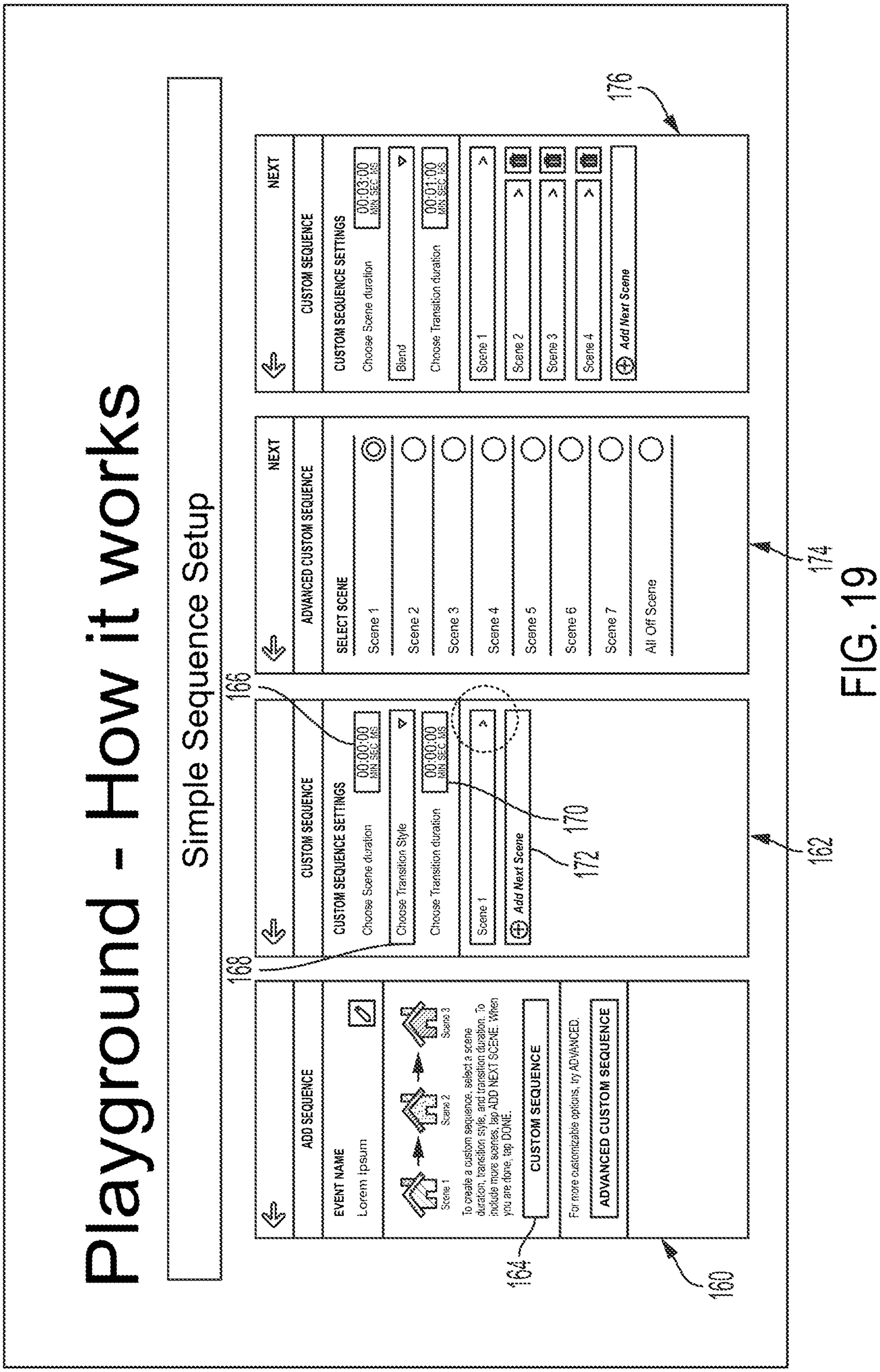
FIG. 19 further illustrates a series menu interfaces of the graphical user interface of FIGS. 14 and 18 illustrating a flow of steps for using the graphical user interface of FIGS. 14 and 18 for setting up a light show sequence.

FIG. 19 shows an example series of user interface screens to navigate for a simple sequence setup. In the first interface screen 160, the user can name the sequence and select whether the sequence is a simple sequence (called "custom sequence") or an advanced sequence (called "advanced custom sequence"). In this example, the user selects a custom sequence, which has the same scene duration, transition type and transition duration between scenes. As can be seen in the second interface screen 162, upon selecting "custom sequence" 164 in the first interface screen 160, the user is given an interface 162 that allows the user to input the scene durations 166, the transition styles 168 and the transition durations 170 for all scenes. The user is also given the ability to add scenes to the custom sequence by hitting the "add new sequence" button 172, which takes the user to the third interface screen 174 that allows the user to select from a scenes to add to the sequence or to select an "all off scene." The fourth interface screen 176 shown in FIG. 19 shows the final custom sequence after setting up the sequence with four scenes, a three minute scene duration, a one minute transition time between scenes and a "blend" transition type.

Figure 20:
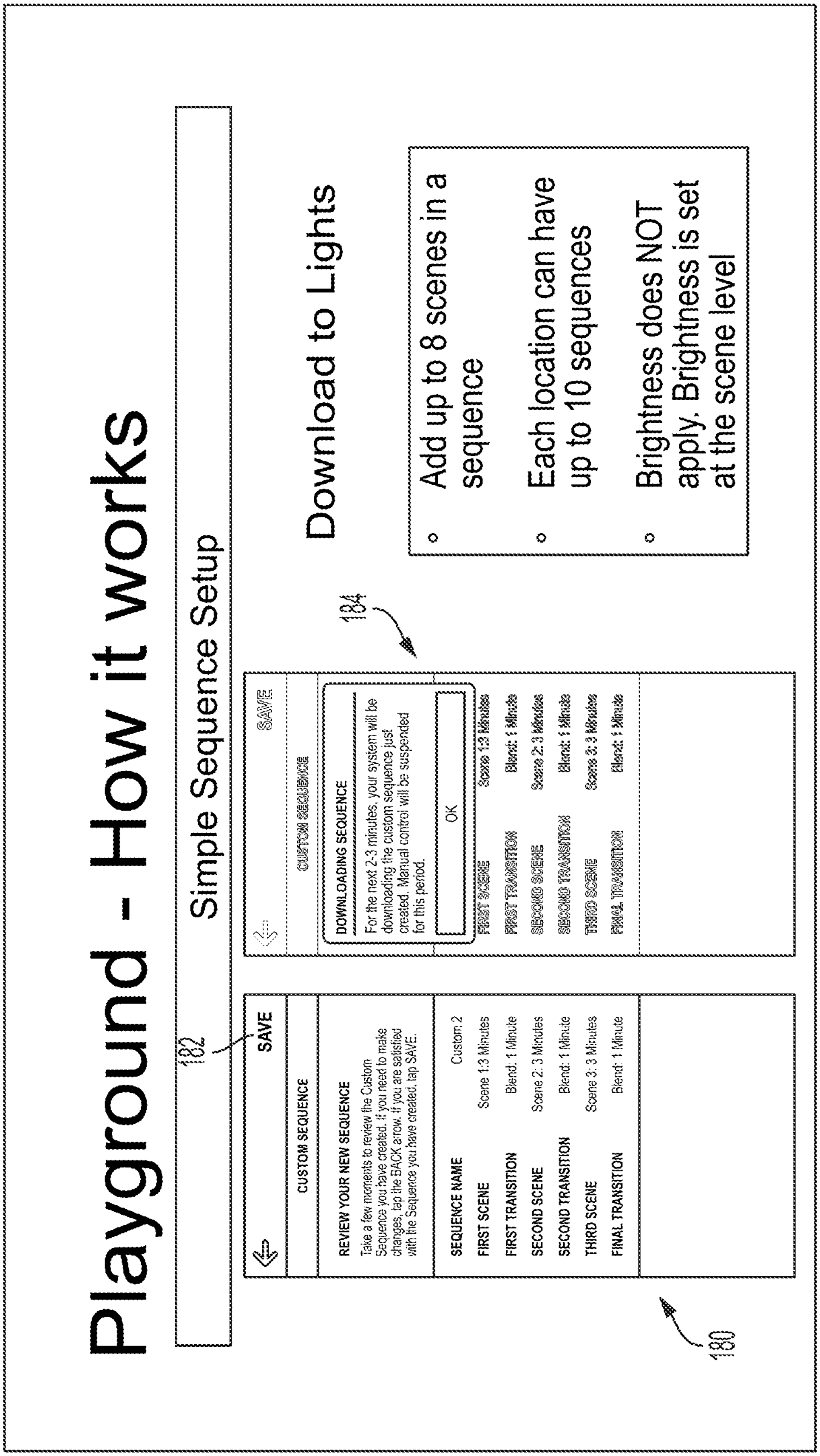
FIG. 20 further illustrates a series menu interfaces of the graphical user interface of FIGS. 14, 18 and 19 illustrating a flow of steps for using the graphical user interface of FIGS. 14, 18 and 19 for setting up a light show sequence.

FIG. 20 shows an example interface screen 180 in which the user can review the custom sequence set up above and hit the "save" button 182 when satisfied. Upon hitting save 182, the next interface screen 184 will ask if the user whishes to initiate uploading the custom sequence programs to the smart lighting fixtures.

FIG. 21 shows an example series of user interface screens to navigate for an advanced sequence setup. In the first interface screen 190, the user can name the sequence and select whether the sequence is a simple sequence (called "custom sequence" 192) or an advanced sequence (called "advanced custom sequence" 194). In this example, the user selects an advanced custom sequence 194. Upon selecting the advanced custom sequence 194, the user is taken to the next interface screen 196 for selecting the first scene in the sequence 198, setting a scene duration 200, choosing a transition type 202 and setting a transition duration 204. As shown in the third interface screen 206, upon hitting the "select first scene in the sequence" tab 198, the user is given a menu to select the first scene from a menu of available scenes. In this example, the "cool vibes" scene is selected which is shown in the next two interface screens 208, 210.

As shown in FIG. 22, upon selecting and setting up all the scenes for this advanced custom sequence, the user is again permitted to review and save the sequence, which will again upload the sequence programs to the smart light fixtures upon approval by the user.

FIG. 23, provides some example user interface screens showing an ability to password protect access to various scenes.

It is to be understood that the methods and systems are not limited to specific methods, specific components, or to particular implementations. It is also to be understood that the terminology used herein is for the purpose of describing particular embodiments only and is not intended to be limiting.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to written discussions, example user interface sequences, block diagrams and/or flowchart illustrations of methods, systems, apparatuses and computer program products. It will be understood that each may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the written discussions, user interface sequences, block diagrams and/or flowcharts.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the written discussions, user interface sequences, block diagrams and/or flowcharts. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the written discussions, user interface sequences, block diagrams and/or flowcharts.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Having disclosed the inventions claimed herein in reference to a number of potential embodiments and examples, it will be understood that it is not intended that any details from such embodiments be incorporated into the plain and ordinary meaning of any of the following claim terms. Nevertheless, it should be understood that the term "fixture" as used herein is not intended to imply that any such lighting or speaker devices are permanently fixed in place—e.g, they may be temporarily fixed in place—may be moved as desired.

What is claimed is:

1. A lighting system comprising:

a plurality of lighting devices, each lighting device including a processor, a memory, a first communication interface and one or more light sources; and a computerized controller, including a second communication interface for communicating with the plurality of lighting devices;

wherein the system is configured such that the computerized controller uploads light show programs to each lighting device via the first and second communication interfaces;

wherein each uploaded light show program includes one or more scenes, each scene including a combination of one or more settings associated with the one or more light sources for the respective lighting device;

wherein the uploaded light show program includes one or more sequences that links one or more of the scenes together;

wherein each lighting device stores its respective uploaded light show program in the memory and the processor operates the one or more light sources according to the light show program stored in memory; and wherein the system is further configured such that the computerized controller transmits a start command to each lighting device via the communication interfaces and the respective processors initiate the light show program stored in memory at the same time upon receiving the start command.

2. A lighting system comprising:

a plurality of lighting devices, each lighting device including a processor, a memory, a first communication interface and one or more light sources; and a computerized controller, including a second communication interface for communicating with the plurality of lighting devices;

wherein the system is configured such that the computerized controller uploads light show programs to each lighting device via the first and second communication interfaces;

wherein each uploaded light show program includes one or more scenes, each scene including a combination of one or more settings associated with the one or more light sources for the respective lighting device;

wherein the uploaded light show program includes one or more sequences that links one or more of the scenes together;

wherein each lighting device stores its respective uploaded light show program in the memory and the processor operates the one or more light sources according to the light show program stored in memory;

wherein each lighting device further includes a clock for which the processor times the light show program; and wherein the system is further configured such that the computerized controller transmits a timing command to each lighting device via the first and second communication interfaces and the respective processors synchronize the clock upon receiving the timing command.

3. The lighting system of claim 1, wherein:

each lighting device further includes a clock for which the processor times the light show program; and the system is further configured such that each lighting device receives a timing signal and the respective processors synchronize the clock upon receiving the timing signal.

4. A lighting system comprising:

a plurality of lighting devices, each lighting device including a processor, a memory, a first communication interface and one or more light sources; and a computerized controller, including a second communication interface for communicating with the plurality of lighting devices;

wherein the system is configured such that the computerized controller uploads light show programs to each lighting device via the first and second communication interfaces;

wherein each uploaded light show program includes one or more scenes, each scene including a combination of one or more settings associated with the one or more light sources for the respective lighting device;

wherein the uploaded light show program includes one or more sequences that links one or more of the scenes together;

wherein each lighting device stores its respective uploaded light show program in the memory and the processor operates the one or more light sources according to the light show program stored in memory;

wherein each lighting device further includes a clock for which the processor times the light show program;

wherein the system is further configured such that each lighting device receives a timing signal from a one or more of a cellular network, a wifi network, a Bluetooth connection, a wired signal or the computerized controller; and wherein the respective processors synchronize the clock upon receiving the timing signal.

5. The lighting system of claim 1, wherein each uploaded light show program is customized for each respective lighting device.

6. The lighting system of claim 1, wherein each sequence includes durations for each scene.

7. The lighting system of claims claim 1, wherein each sequence includes transitions between each scene.

8. The lighting system of claim 7, wherein each transition includes one or both of a transition duration or a transition type.

9. The lighting system of claim 8, wherein the transition type may include one or more of a morph transition, a ramp transition or a fade transition.

10. The lighting system of claim 1, wherein the sequence includes a nested sequence linked together with at least one of another sequence or another scene.

11. The lighting system of claim 1, wherein the computerized controller includes a graphical user interface configured to allow a user to modify or create one or more of the light show programs.

12. The lighting system of claim 1, wherein the computerized controller receives the light show programs directly or indirectly from another computerized device, and the other computerized device includes a graphical user interface configured to permit a user to modify or create one or more of the light show programs.

13. The lighting system of claim 1, wherein the lighting devices include a plurality of light sources, each providing a different color light.

14. The lighting system of claim 1, wherein at least one of the light show programs is synchronized to a musical piece.

15. The lighting system of claim 14, further comprising a speaker fixture and wherein the system is configured such that the computerized controller uploads the musical piece to the speaker fixture.

16. A lighting system comprising:

a plurality of lighting devices, each lighting device including a processor, a memory, a communication interface, one or more light sources and a lightshow program stored in the memory for operating the one or more light sources according to the light show program;

each lighting device further includes a clock for which the processor times the light show program;

the system being configured such that each of the plurality of lighting device receives a timing command via the respective communication interfaces and the respective processors synchronize the clock upon receiving the timing command; and the system being further configured such that each of the plurality of lighting devices receive a start command via the respective communication interfaces and the respective processors start the respective light show program at the same time upon receiving the start command.

17. The lighting system of claim 16 wherein the timing command is received from a cellular network, a wifi network, a Bluetooth connection, a wired signal or from a lighting system controller.

18. A lighting system comprising:

a plurality of lighting devices, each lighting device including a processor, a memory, a first communication interface and one or more light sources; and a computerized controller, including a second communication interface for communicating with the plurality of lighting devices;

wherein the system is configured such that the computerized controller uploads light show programs respectively to each lighting device via the first and second communication interfaces;

wherein each of the plurality of lighting device is configured to store its uploaded light show program in the memory for execution by the processor; and wherein the computerized controller is wired to each of the plurality of light fixtures in a daisy-chain fashion via a power line and the light show programs are transmitted from the second communication interface to the first communication interfaces using frequency modulation over the power line.

19. The lighting system of claim 18, wherein at least two of the uploaded light show programs are different.

20. A method for controlling a lighting system, comprising steps of:

providing a plurality of lighting devices, each lighting device including a processor, a memory, a first communication interface and one or more light sources;

providing a computerized controller, including a second communication interface for communicating with the plurality of lighting devices;

transmitting light show programs respectively to each lighting device from the computerized controller via the first and second communication interfaces;

storing in the memory, by each lighting device, its respective light show program transmitted from the computerized controller;

receiving a timing command by each lighting device and each lighting device synchronizing its clock based on the received timing command;

receiving a start command by each lighting device from the computerized controller; and executing, by each lighting device, its stored light show program by the processor upon receiving the start command.

21. The method of claim 20, wherein the transmitting step is performed using frequency modulation over a wired powerline to each of the plurality of lighting devices.

22. The method of claim 20, further comprising a step of synchronizing at least one of the light show programs to a musical piece.

23. The method of claim 20, wherein at least two of the light show programs are different.

24. The method of claim 20, wherein each light show program is customized for each respective lighting device.

25. The method of claim 24, further comprising steps of:

receiving by the computerized controller light show information from a user's mobile computing device; and converting, by the computerized controller, the received light show information into the light show programs.

26. The method of claim 24, further comprising a step of receiving by the computerized controller the light show programs from a network server.

27. The method of claim 26, further comprising a step of generating by the network server the light show programs based upon information received from a user's mobile computing device.

28. The method of claim 20, wherein:

at least one of light show programs includes one or more scenes, each scene including a combination of one or more settings associated with the one or more light sources for the respective lighting device; and further includes one or more sequences that links one or more of the scenes together.

29. A non-transitory memory device comprising computer instructions for performing the computerized steps of:

receiving at least one of (a) a plurality of light show programs or (b) light show instructions for converting into a plurality of light show programs;

transmitting the plurality of light show programs to a respective plurality of lighting devices;

synchronizing clocks on the plurality of lighting devices; and transmitting a start command to each of the plurality of lighting devices.

30. The non-transitory memory device of claim 29, wherein the synchronizing step occurs on a periodic basis.

* * * * *